United States Patent
Parham et al.

(10) Patent No.: US 12,423,386 B2
(45) Date of Patent: Sep. 23, 2025

(54) MODEL-DRIVEN DATA INSIGHTS FOR LATENT TOPIC MATERIALITY

(71) Applicant: C3.ai, Inc., Redwood City, CA (US)

(72) Inventors: David William Parham, Castro Valley, CA (US); Hang Le Thi Nguyet, Redwood City, CA (US); Robert S. Young, San Francisco, CA (US); Suvansh Dutta, New York, NY (US); Thanaspakorn Niyomkarn, New York, NY (US)

(73) Assignee: C3.ai, Inc., Redwood City, CA (US)

( * ) Notice: Subject to any disclaimer, the term of this patent is extended or adjusted under 35 U.S.C. 154(b) by 0 days.

(21) Appl. No.: 18/418,171

(22) Filed: Jan. 19, 2024

(65) Prior Publication Data
US 2024/0248963 A1    Jul. 25, 2024

Related U.S. Application Data

(60) Provisional application No. 63/504,370, filed on May 25, 2023, provisional application No. 63/440,399, filed on Jan. 21, 2023.

(51) Int. Cl.
*G06F 7/00* (2006.01)
*G06F 18/2415* (2023.01)
*G06Q 50/26* (2012.01)

(52) U.S. Cl.
CPC ......... *G06F 18/2415* (2023.01); *G06Q 50/26* (2013.01)

(58) Field of Classification Search
CPC ............. G06F 18/2415; G06Q 50/26
USPC ........................................ 707/600–899, 739
See application file for complete search history.

(56) References Cited

U.S. PATENT DOCUMENTS

| | | | |
|---|---|---|---|
| 9,324,323 B1 | 4/2016 | Bikel | |
| 9,473,637 B1 | 10/2016 | Venkatapathy | |
| 11,532,179 B1 | 12/2022 | Anooj | |
| 2013/0108994 A1 | 5/2013 | Srinivasa | |
| 2018/0121539 A1* | 5/2018 | Ciulla | ............ G06F 16/3344 |
| 2018/0158365 A1 | 6/2018 | Roche | |
| 2018/0196796 A1 | 7/2018 | Wu | |
| 2020/0065612 A1 | 2/2020 | Xu | |

OTHER PUBLICATIONS

Zhang, Min-Ling et al., "ML-KNN: A Lazy Learning Approach to Multi-Label Learning," Pattern Recognition, vol. 40, No. 7, Jul. 2007.
International Application No. PCT/US2024/012285, Search Report and Written Opinion dated Apr. 30, 2024.
Zhou, Yongchao et al., "Large Language Models are Human-Level Prompt Engineers," arXiv:2211.01910v2, Mar. 10, 2023.
Brown, Tom B. et al., "Language Models are Few-Shot Learners," arXiv:2005.14165v4, Jul. 22, 2020.

(Continued)

*Primary Examiner* — Isaac M Woo
(74) *Attorney, Agent, or Firm* — NDWE

(57) ABSTRACT

Described herein are machine learning methods and systems for locating and tracking performance of latent themes in changing data from disparate sources. Themes may be indirect goals or consequential impacts indicated by latent topics. Identifying performance indicators of latent themes in large changing data sets uncovers underlying trends or previously concealed behaviors that may be accelerating or undermining goals.

20 Claims, 6 Drawing Sheets

(56) References Cited

OTHER PUBLICATIONS

Chung, Hyung Won et al., "Scaling Instruction-Finetuned Language Model," arXiv:2210.11416v5, Dec. 6, 2022.
Gao, Luyu et al., "Precise Zero-Shot Dense Retrieval without Relevance Labels," arXiv:2212.10496v1, Dec. 20, 2022.
Khattab, Omar et al., "Demonstrate-Search-Predict: Composing Retrieval and Language Models for Knowledge-Intensive NLP," arXiv:2212.14024v2, Jan. 23, 2023.
Kojima, Takeshi et al., "Large Language Models are Zero-Shot Reasoners," arXiv:2205.11916v4, Jan. 29, 2023.
Longpre, Shayne et al., "The Flan Collection: Advancing Open Source Methods for Instruction Tuning," Google Research Blog, Feb. 1, 2023.
Lu, Pan et al., "Dynamic Prompt Learning via Policy Gradient for Semi-structured Mathematical Reasoning," arXiv:2209.14610v3, Mar. 2, 2023.
Santhanam, Keshav et al., "ColBERT: State-of-the-Art Neural Search," Jan. 2023 [retrieved from github.com/stanford-futuredata/ColBERT].
Wang, Boshi et al., "Towards Understanding Chain-of-Thought Prompting: An Empirical Study of What Matters," arXiv:2212.10001v2, Jun. 1, 2023.
Wei, Jason et al., "Chain-of-Thought Prompting Elicits Reasoning in Large Language Models," arXiv:2201.11903v6, Jan. 10, 2023.
Zhang, Zhuosheng et al., "Automatic Chain of Thought Prompting in Large Language Models," arXiv:2210.03493v1, Oct. 7, 2022.

* cited by examiner

MODEL-DRIVEN DATA INSIGHTS FOR LATENT TOPIC MATERIALITY

CROSS-REFERENCE TO RELATED APPLICATIONS

The present application claims priority to U.S. Provisional Patent Application Ser. No. 63/440,399 filed Jan. 21, 2023 and entitled "AI Based Predictions for Viability Targeting and Resource Allocation," and U.S. Provisional Patent Application Ser. No. 63/504,370 filed May 25, 2023 and entitled "AI Based Predictions for Viability Targeting and Resource Allocation," each of which is incorporated herein by reference.

BACKGROUND

Environmental, social, and governance (ESG) issues have increased attention from regulators, investors, managers, and customers. An organization's progress and performance towards ESG concepts are used as a driving metric in decision making. However, technical challenges block automated scaled identification or detection of data to evaluate and monitor ESG performance such as incompatible data sources with varying terminology and hidden or implicit relevant information. Data sources from which ESG performance and other factors may be derived are often geographically and/or logically remote, such as between systems at different physical locations, or data sets associated with different parts of an organization. These isolated and fragmented data sets are difficult to quantify, track, and consistently evaluate indirect performance across an organization or within a subset of an organization. Another challenge is efficiently locating the specific factors that are relevant to different decision makers, especially since prioritization of different ESG factors by decision makers may change over time. As a result of the above and other technical challenges, conventional approaches fail to provide decision makers with effective tools to identify, evaluate, quantify, and monitor various aspects of complex issues derived indirectly from large data sources.

DETAILED DESCRIPTION

Figure 1:
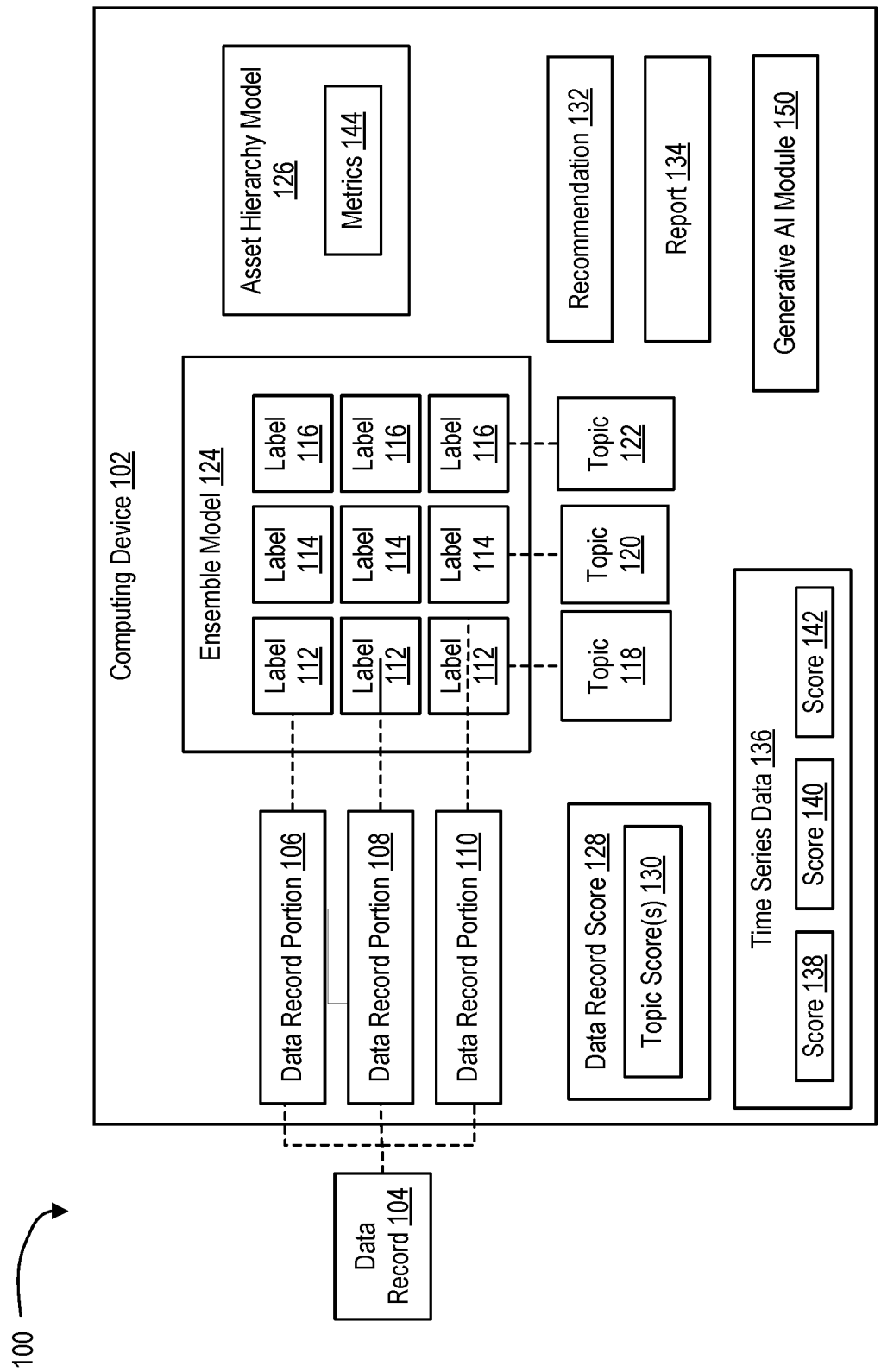
FIG. 1 depicts a system for receiving and processing data to identify associated discussions according to an exemplary embodiment of the present disclosure.

Enterprises have growing collections of data and increased demands for tracking and reporting complex topics and themes, typically under time pressure and with constrained resources. Large data sets are generated across functional areas with constantly shifting or contradictory viewpoints and in a variety of formats, yet such data can indicate performance, behaviors, or themes of the organization. Unlocking insights from the data can produce meaningful information to track changes in stakeholder priorities over time and widen the aperture of stakeholder signals.

Conventional technical approaches to automated topics and tracking and analysis of large latent complex and conflicting topics in data are often inefficient. For example, for data integration and reporting, companies may create a spreadsheet that is shared or circulated within the organization. The spreadsheet may be used to gather all the data needed for external reporting and may have to be done at regular intervals (e.g., yearly, quarterly, monthly) to support a regular ESG reporting cycle. Such systems are time-intensive and highly error-prone. As another example, for issue prioritization, companies may pursue multiple strategies, such as direct engagement with stakeholder groups by company engagement teams, desk research of stakeholder group publications and communication channels by analysts, hiring consultants to inquire into and advise a company on its ESG priorities, and the like. Such systems are disparate and inconsistent. As a further example, for performance management of ESG priorities, companies typically lack a formal, enterprise-wide system for tracking ESG efforts and progress. Such systems are instead typically siloed within existing disciplines or departments of the company and require reporting via one or more intermediaries for synthesis and review by executive teams. Accordingly, there exists a need for an enterprise solution for data integration, analysis, and issue prioritization that is compatible with reporting and performance management tools for ESG issues and topics.

Described herein are machine learning techniques for locating and tracking performance of latent themes in changing data from disparate sources. Themes may be indirect goals or consequential impacts indicated by latent topics. Identifying performance indicators of latent themes in large changing data sets uncovers underlying trends or previously concealed behaviors that may be accelerating or undermining goals. For example, ESG factors and performance of an organization may be indicated by data fragmented across multiple data sources and computing systems, data owners, and the like, as well as data outside of an organization. Companies, investors, and customers may have differing interests on which ESG issues or causes are most important, which can lead to shifting signals for decision makers within, e.g., companies and institutional investment firms. Due to this lack of data, companies may have difficulty identifying specific, tangible opportunities to drive performance improvements. Reporting requirements to certify compliance with ESG issues and causes may be constantly changing as reporting standards are updated and demands from stakeholders change.

An example aspect of the system disclosed herein may provide data completion executive dashboards which may include the ability to monitor comprehensiveness of all data along dimensions of ESG standards and categories. Users can track the update-recency of performance measures, identify measures needing updates, and monitor all data-update activities. The system may provide performance measure lineage and auditability to facilitate the ability to track every individual data point incorporated into any report, including its data source, frequency of update, owners, editors, ESG standard framework codes, and availability for inclusion in future reports. The system may also provide data explorer graph visualizations which may include advanced graph visualization that enables ad-hoc analysis of relationships between issues, datapoints, companies, business units, facilities, data owners, reports, and ESG frameworks. The system may provide flexible performance measure tagging—the ability to create and manage custom groupings of performance measures (e.g., aligned to a potential new regulatory requirement or investor questionnaire) to simplify stakeholder engagement and automatic population of one-off disclosures. The system may also provide data owner workflows—the ability to assign specific performance measures to individual data owners and enable those data owners to make updates, track lineage, compare across company assets, automatically validate data quality, and manage supporting materials.

An example implementation of the model-driven data insights for latent topic materiality includes ingesting data from a disparate data sources to identify data portions of multiple data sets with information that relates to the one or more issues. The method evaluates the information for each data set against an ensemble model to determine a set of topics for the issues and generates a topic materiality score for each data portion that indicates relevancy of the information to a particular topic in the set. A time series aggregation model is trained with the topic materiality scores for issues over time for the data portions of multiple data sets. The trained time series aggregation model is used to generate insights analysis for a selected issue of the one or more issues. This novel approach allows the insight analysis to be applied to updated data from the disparate data sources to produce reliable relevant tracking, insights, and predictions while saving significant computational costs.

Example aspects described herein provide a complete ESG data integration, materiality analysis, performance management, and reporting AI application. Benefits of the model-driven data insights for latent topic materiality methods and software applications include near real-time insights into which ESG issues have importance across stakeholder groups through NLP; enhanced ESG performance through the ability to define initiatives, set targets, and track progress in near real-time across all ESG issues; reduction in repetitional or legal risks due to the ability to trace, audit, error check, and ultimately ensure the accuracy of reported ESG data; reduction in the time/effort required to manage ESG data through automated data ingestion from source systems (systems of record) and persistence in ESG; and reduction in the time required to produce external reports through the automated ability to map available ESG data to a range of reporting standards and frameworks, among others.

ESG issues refer to the set of environmental, social, and governance-related issues that companies both contribute to and are impacted by. Broadly, each of these categories can refer to issues such as: Environmental issues: greenhouse gas emissions, air emissions, energy, water, waste, biodiversity; Social issues: Human rights, customer privacy, data security, product safety and labeling, labor practices, health and safety, diversity and inclusion; Governance-related issues: Business ethics, competitive behavior, legal and regulatory engagement, risk management. Different stakeholder groups will frequently prioritize different issues, resulting in companies receiving a mosaic of ESG-related informational requests across stakeholder groups. The ability of companies to meet external reporting requirements, identify priority issues, and deliver on performance commitments necessitates significant enhancement of their internal capabilities with respect to managing and analyzing ESG data. Currently, nearly all companies lack a single, unified system for ESG data, and must undergo multi-month processes utilizing dozens of individuals to collect ESG data across the organization and compose it into a single unified view of the organization's ESG performance. The process is labor-intensive and error-prone, thereby preventing companies from receiving the real-time, accurate insights needed to correctly prioritize the right issues and effectively manage performance on those issues. In addition, the error-prone nature of these highly manual data management processes creates significant regulatory risk for companies should inaccurate data be publicly disclosed or reported directly to regulators.

An example implementation of the model-driven data insights software includes data unification and management modules for unifying ESG data, including integrating with enterprise systems to automate data collection as well as through manual data entry workflows. The software identifies erroneous data upon entry to enable immediate corrective action via an issue prioritization module for recommending priority ESG issues that organizations establish as "material" for the purposes of performance tracking and external reporting based on sentiment of key external stakeholder groups. Performance management drives performance improvement on ESG issues through establishing goals, targets, and projects that enable users to analyze forward-looking scenarios to define optimal paths to achieve ESG goals. A reporting module generates output to meet regulatory reporting requirements and achieve reporting objectives by enabling the user to easily compose reports by mapping available internal data to external reporting requirements, including major ESG standards and frameworks.

Machine learning models can be applied to categorize and tag data records (e.g., documents and documentation) regarding one or more ESG issues, such as climate, biodiversity, diversity, equity, inclusion, and the like. "Document" and "documents" may be used to refer to a type of data record, but other types of data records may also be used instead of, or in addition to, documents. In particular, a computing device may be configured to receive one or more data records regarding ESG issues and to divide the data records into one or more data record portions. Data record portions may then be analyzed by a machine learning model to determine one or more labels for the data record portions that identify one or more topics discussed within the data record portions. Topic scores may then be generated for the discussed topics based on the labels identified.

Machine-learning with natural language processing (NLP) is particularly well suited to track explicit terms mentioned in documents such as reports, press releases, guidelines, etc. Even with NLP, building an AI application that ingests and processes data from documents or data sources with differencing vocabulary for topic themes and incomplete information in an automated way is a difficult task. An example aspect of the disclosure is a technical solution to addressing the technical problem of how to analyze the materiality to which a document discusses different topics for multi-faceted themes. The machine-learning based approaches described produce analysis to measure and track goals across large organizations tailored for differing stakeholders. The analysis can be used to determine viability targeting and resource allocation.

A machine-learning pipeline is disclosed for ingesting disparate data sources with time series aggregation to generate organization-level topic materiality and actionable insights. This machine-learning pipeline is an ensemble model built from a combination of different components rolled into one, each designed to make a decision about the content of a paragraph that culminates in a prediction and answers the question: does this paragraph discuss a specific a specific topic. The pipeline with ensemble model enables a highly generalizable, scalable, and configurable system for complex latent topics that works with a variety of data sources with varying vocabulary, incomplete context, among other challenges. Large amounts of documents and data sources do not use uniform keywords or terms, or introduce context to connect topics that are indirectly discussed but have relevant information that is pertinent to measuring and analysis of topics to attain higher-quality more accurate insights. The ensemble model approach is highly configurable to different domain expertise with improved machine-learning based interrogation of the data.

Conventional machine learning approaches require complete label sets and lose performance with incomplete label sets. An example aspect of this disclosure is a novel extension to the multi-label k nearest neighbors (MlKnn) algorithm that enables the model to make use of incomplete label sets. In particular, data record scores and/or topic scores that indicate how frequently particular ESG issues are discussed within the received data records may be used to indicate a priority of the ESG issues for one or more associated entities. In particular implementations, data record scores and other metrics computed based on the received data records may be used to determine how the entity's ESG priorities have changed over time and/or may be used to determine the need for and/or scope of ESG initiatives, including the operational metrics these initiatives reference.

An example aspect works to create an understanding of how topics relate hierarchically in whichever document it is analyzing. Post-processing ensures the model is considering how topics overlaps and are connected. For example, a model analyzing a report that mentions multiple ESG topics (e.g., greenhouse gas emissions, biodiversity, etc.) where the topics are, at minimum, not only related to each other, but also fall under the umbrella of more comprehensive ESG topics such as climate. But different documents may use different terms or not make any mention of contextual information. For example, the reports about GHG emissions and biodiversity that are being discussed under this umbrella topic may never mention climate. Post-processing can inflate the score, giving the topic of climate to ensure it is being weighted fairly in the model.

The NLP approach for ESG stakeholder materiality leverages two publicly available large language models (LLMs): a general and a domain-specific BERT model. These LLMs are used to generate text embeddings that represent the definition and semantically related words for a given ESG topic. The model leverages the embeddings to identify when and to what extent an ESG topic is discussed in a paragraph. Text embeddings are numerical representations of text, and similar embeddings represent text content with similar meanings. Text embeddings from both LLMs are leveraged in the NLP pipeline and can include general embedding and domain embedding. General embeddings are produced by a general BERT model that is effective at capturing semantic similarity between sentences and short paragraphs. Domain embedding are produced by a domain BERT model that is particularly strong at capturing the ESG-specific content of the text.

The machine-learning pipeline takes paragraph text data as inputs and produces a prediction that indicates whether a topic (e.g., an ESG topic) is discussed in the paragraph. It also produces a score representing how similar the paragraph is to a "centroid" (domain embedding) that defines the ESG topic. Both outputs are produced on a per topic per paragraph basis because each paragraph can discuss multiple ESG topics. The machine-learning pipeline operates at paragraph-level for the benefit of adapting the token length limitations of LLMs, and because a paragraph is the shortest component of a document at which the presence of an ESG topic can be measured without losing context.

FIG. 1 depicts a system 100 for receiving and processing data records to identify associated ESG discussions according to an exemplary embodiment of the present disclosure. The system 100 includes a computing device 102. As will be described in more detail below, the computing device 102 may be configured to analyze data obtained from one or more data sources. The data may include one or more data records, such as data records 104, or other types of data. The data analysis performed by computing device 102 may include identification of one or more topics indicated by the data and prioritization of the identified issues, as described in more detail below. As a non-limiting example, issue identification and prioritization analysis may include identifying issues associated with discussion of one or more ESG topics within one or more portions of the data record 104, shown in FIG. 1 as data record portions 106, 108, 110. The ESG issues identified within the data record portions 106, 108, 110 may be related to one or more topics, shown as topics 118, 120, 122. It is noted that a single piece of data, such as a data record, may have one or more data portions (e.g., the data record portions 106, 108, 110) and each data portion may be associated with zero or more issues (e.g., a piece of data or portion(s) of the data may not be related to an issue or topic of interest or may include one or more data portions related to at least one issue or topic of interest, such as a topic related to ESG). It is further noted that while examples used to illustrate the functionality of the computing device 102 are described herein with reference to identification and prioritization of issues or topics related to ESG, it should be readily understood that the computing device 102 and the functionality it provides could be readily applied to other issues or topics of interest in accordance with the concepts disclosed herein.

An example method comprises evaluating information associated with the set of record portions against an ensemble model to generate a set of scores, where the ensemble model is configured to assign a plurality of labels to each record portion of the set of record portions, the plurality of labels corresponding to a different topic of a set of topics, and the set of scores comprises a score for each label of the plurality of labels for each record portion of the set of record portions; generating record scores for each record of the corpus of records, etc.

Ensemble models are a machine learning approach that combine the strengths of multiple diverse models to create a single, more accurate prediction. This ensemble machine learning method uses multiple algorithms to obtain better predictive performance than could be obtained from any of the traditional learning algorithms. The ensemble model can be configured to generate the set of scores based on a first set of predictions and a second set of predictions output by a first model and a second model, respectively. Example methods include means for predicting enterprise changes to improve performance towards goals of an initiative, the changes being secondary to the primary function. The initiative can be cross-functional for overlapping goals. Progress of an initiative can be tracked by assets as primary function indicators with constraints and/or performance indicators corresponding to and contributing to a particular initiative. Another example method includes means for reporting the performance of an initiative; configuring a materiality model of topics for a specified initiative, wherein the specified initiative has issues/goals with associated topics; analyzing data from disparate data sources including internal asset data sources and external research/influence data sources with different types of data records, wherein the data is analyzed to identify data points that are related to one or more topics; etc.

As shown in FIG. 1, the computing device 102 includes an ensemble model 124, an asset hierarchy model 126, a materiality model 312, and a model 314. The ensemble model 124 may be configured with a set of labels 112, 114, 116. As will be described in more detail below, functionality provided by one or more of the ensemble model 124, the asset hierarchy model 126, the materiality model 312, and the model 314 may be used to generate a data record score 128, time series data 136, a recommendation 132, a report 134, or other outputs in accordance with the concepts described herein. The data record score 128 may include one or more topic scores 130. The time series data 136 may include one or more of the scores 138, 140, 142. The asset hierarchy model 126 may include metrics 144.

In an aspect, the computing device 102 may be configured to evaluate information associated with a set of data portions from a corpus of data. The corpus of data may include a corpus of data records and the computing device 102 may divide the data records to produce one or more data record portions (e.g., the data record portions 106, 108, 110). The data record portions may be generated based on a fragmentation criterion, such as a fragmentation criterion that indicates a data record is to be divided into data record portions at the sentence level (e.g., each data record portion corresponds to a different sentence of a data record), the paragraph level (e.g., each data record portion corresponds to a different paragraph of a data record), the page level (e.g., each data record portion corresponds to a different page of a data record), or some other criterion. The particular fragmentation criterion used for a piece of data may differ according to the type of data being divided into data portions. To illustrate, the exemplary fragmentation criteria described above are based on data that includes data records, but aspects of the present disclosure may be readily applied to other types of data (e.g., tabular data, unstructured data, etc.) and other fragmentation criteria may be used to generate data portions from such other types of data (e.g., fragmenting tabular data based on rows, columns, tables, etc.). Also note that aggregation may be performed across data record portions. For example, topics may be identified at a sentence level and aggregated to a paragraph level, such that the topics identified in a paragraph are equal to the union of all topics identified in each of the paragraph's sentences, as well as the topics identified in the paragraph but not in any particular sentence.

The ensemble model 124 enables users to unify their environmental, social, and governance-related data into a single system. Users will be able to review available data, identify gaps, and take action to obtain missing data through prioritizing additional data integrations or through manual data entry workflows. Users are able to browse a library of thousands of ESG performance measures ("data points") that are pre-built as part of the application. For each key performance indicator (KPI), users will be able to specify the data collection method as well as the level within the organization to which the data point applies (facility, business unit, or enterprise). When specifying how data are collected, users are able to define the update frequency and due date by which new data must be entered to support internal ESG performance management as well as external reporting.

Data connectors enable users to connect ESG metrics to source enterprise systems, including but not limited to ERP, EHS, HRMS, and other systems. Users are able to select any "data point" from the library, specify a source system, and complete a guided series of steps to connect C3 AI ESG to the source system to automatically import the specified KPI at a frequency specified by the user. Data can be imported via a canonical interchange format including exporting data from existing enterprise systems, transferring, and loading into C3 AI ESG. The application includes validating that data are accurate at the point and time of entry. Accuracy is assured through anomaly detection to determine whether a value is suspected to be inaccurate based on historical values at the asset-instance (i.e., does the latest value differ significantly from prior values for a facility instance and/or for a business unit instance). If a value is suspected to be inaccurate, it results in immediate action to check, validate, and/or correct the value.

The materiality model 312 helps identify which issues to prioritize by analyzing two dimensions of performance: external stakeholder perception and internal company impact. Determining which issues are "material" is a foundational step in a company's overall ESG approach, and serves as a basis for setting subsequent performance goals and targets as well as for external reporting. Materiality scores can be calculated and re-calculated bases on intervals or threshold of data integrity. For example, the application can ingest all new data sources each day across source types (see Data Sources section, External Data Sources subsection). All new and prior ingested data sources contribute to the score; however, the contribution of prior ingested data sources exponentially decays over time (see below). As such, data sources that were ingested previously and have not been updated can avoid be re-ingested.

In some implementations, materiality scores are persisted at all levels of granularity across all stakeholder types. This includes aggregate, categorical scores (Environmental, Social, Governance), issue-level scores (e.g., Greenhouse Gas Emissions, an issue in the Environmental category), stakeholder group scores for each issue (Greenhouse Gas Emissions score for the stakeholder group Investors), stakeholder-instance scores for each issue (Greenhouse Gas Emissions score for the Investor instance BlackRock), and source document scores for each issue (Greenhouse Gas Emissions score for the Source Document instance Press Release for the Investor instance BlackRock). These values are able to be plotted as a time series through the visualizations as described herein. A Material Issues Matrix enables identifying high-priority ESG issues based on the materiality score as well as the impact of such issues on the impact; allows addition or removal of issues as "material"; and allows break down of the ESG score by stakeholder category. A Material Issues Analysis enables detection of how issue materiality scores are changing over time, as well as investigation of the underlying evidence driving the materiality score, and can create a Material Issue Heat Map ("Visualization").

A Data Vision chronograph depicts the materiality score over time for each ESG issue. UX can dynamically adjust the timescale to review how the materiality score has changed over the specified time period. Selecting the issue name navigates to the issue detail page. Evidence Grid and Filter Panel depict a grid displaying the underlying evidence contributing to the materiality score. Each row corresponds to an individual ESG element, consisting of a unique combination of the ESG issue and source document.

An example aspect includes an issue materiality machine learning pipeline that determines the materiality of a set list of issues for a set of stakeholders, stakeholder groups, and target organizations. In some implementations, the issue materiality machine learning pipeline includes paragraph-level issue classification methodology. Example implementations enable several functions and advantages. Users can define their own issue using only an issue name and one or more of the following examples, and immediately begin producing results: (1) issue definition, (2), set of example text containing the issue, and/or (3) key terms and key term logic associated with the issue. Furthermore, unlike other approaches, it does not require an initial labeled dataset. Additionally, it can improve model performance using user feedback. In some implementations, the issue materiality machine learning pipeline includes materiality aggregation methodology. For example, a methodology transforms paragraph-level classifications into a document-level materiality score, and/or a methodology weights stakeholder groups and document types with time decay to generate time series trends of issue materiality for an organization. Additional aspects of the issue materiality machine learning pipeline address definition of issues within a label tree such that some ESG issues can be defined as combinations of other issues. For example, an ESG text annotation methodology in which text is automatically filtered using rule-based issue classification to save annotation time.

Each issue materiality score is aggregated over individual underlying stakeholder-specific materiality scores (e.g., investor score, employee score, customer score, etc.). Each stakeholder score in turn is aggregated over individual source documents specific to that stakeholder type (e.g., for investors, source documents include Investment Stewardship/Engagement Guides, Proxy Voting Guidelines, Press Releases, etc.). Scores will evolve over time as new documents are published (e.g., when an investor issues a new press release) through automated scraping, ingestion, and NLP analysis.

Document-specific materiality scores are generated by parsing the source document, classifying elements according to the ESG issue being discussed (e.g., greenhouse gas emissions, biodiversity, employee health and safety), and finally generating an aggregate score for the source document based on the relative strength of the overall discussion of each issue in the document.

As used herein, stakeholder group may refer to a list of different stakeholder groups (investors, customers, employees, communities, etc.) and their corresponding weights when aggregating materiality scores across stakeholder groups. Evidence type may refer to a list of different types of evidence associated with each stakeholder group and their corresponding weights for aggregating materiality scores across evidence types within stakeholder groups. Evidence category may refer to a list of pairs of stakeholders and associated evidence types. Evidence may refer to an actual ingested document corresponding to an evidence source. Evidence score may refer to a materiality score associated to each ESG issue for each evidence source. Evidence source score may refer to a materiality score for a given ESG issue across all evidence sources of the same type over the prior timestep (e.g., one day). Stakeholder score may refer to a materiality score for a given ESG issue across all evidence types. This score may use the weights described in association with evidence type. Stakeholder group score may refer to a materiality score for a given ESG issue across all stakeholders within a stakeholder group. ESG issue score may refer to a materiality score for a given ESG issue across all stakeholder groups. Stakeholder group scores may be combined using the weights associated with each stakeholder group.

As noted herein, all historical documents should contribute to the materiality score calculated for the current time period. However, the contribution of historical documents to the current time period score should decay exponentially over time via a standard half-life formula:

$$N(t) = N_0 \left(\frac{1}{2}\right)^{\frac{t}{t_{1/2}}}$$

Where N(t) is the materiality score in the current time period, No is the value of the materiality score calculated when the source document was originally ingested, t is the number of timesteps since the original ingestion date (e.g., days), and $t_{1/2}$ is the specified half-life of the score. Half-life scores are specified for each source document type, and are applied identically to all source document instances.

The model-driven application composes reports to communicate the performance on priority issues. When generating a new report, calibration is configured for the purpose/objectives of the report, the segments/activities it applies to within the company, the period of time it applies to, external reporting standards or frameworks that must be met, and other information. Based on this information, the AI based application generates a recommended reporting outline, including the issues and underlying data that should be included in the report.

In the reporting module, each issue and the associated performance data is reviewable and adjustable. Available data is quickly identified and, for data that is unavailable, the status of each data point is investigatable. Missing or low data density are identified to trigger data management workflows described herein. For example, if data cannot be obtained prior to the report deadline, substitute in alternative available data sources. Most relevant alternative data are identified based on an application-calculated relevance score. The reporting module also alerts if data is predicted to be inaccurate based on AI-driven anomaly detection, and can take action to ensure it is corrected. If source data are updated, the application triggers a review and all actions taken associated with report composition and data management are recorded by the application for traceability/auditability purposes.

Reports can then easily integrate the data into existing production software for external communications. An example implementation of the AI based application enables the ability in the UI for users to refactor previous data to bring it into compliance with new versions of data points. For example, if a prior data point was "Injuries per 100,000 working hours" and the new version of the metric is "Injuries per 200,000 working hours," the application allows for all historical data to be bulk updated to the new metric by applying the appropriate refactoring.

With large diversity in the aspects of the data, spanning concepts from greenhouse gas emissions to data security to business ethics, the AI based application includes the ability to flexibly organize data according to a wide range of organizational concepts. While the application directly supports concepts such as an issue and asset hierarchy, the AI based application can customize for unique organizing concepts to apply to data, such as geographies, regulatory regimes, business relationships, whether a data point should be only used internally or externally, whether an asset is company operated or operated by a partner, etc. The reporting module of the application identifies if a value entered for a data point/facility instance is suspected to be inaccurate. The notification can occur upon submission of the entered value, and may require the value correction or confirmation that the value is accurate as originally sourced.

Performance scores are intended to provide the user with an indication of the effectiveness of the company's efforts to achieve its initiatives and targets related to each material ESG issue (see subsequent requirements related to initiatives and projects). Performance scores range from 0-100 and are calculated as follows:

$$P_i = \frac{100}{n} \times \sum_{k=1}^{n} \frac{C_{i,a,k}}{C_{i,p,k}}$$

Where:
- $P_i$ is the performance score for ESG issue i
- n is the number of initiatives on that ESG issue
- $C_{i,a,k}$ is the actual completion percentage of initiative k on ESG issue i
- $C_{i,p,k}$ is the planned completion percentage of initiative k on ESG issue i Note that the quotient of the actual completion percentage and the planned completion percentage should not be allowed to exceed 1, and therefore the issue performance score should never exceed 100 nor should being ahead of schedule on one initiative offset being behind schedule on another.

The application calculates progress towards completing initiatives. Initiative progress is calculated as an aggregation over the completion of underlying projects, and the contribution of each project towards achieving the quantitative outcomes defined in the initiative (i.e., the performance in the target year minus the performance in the base year). The planned completion percentage $C_{i,p,k}$ can be calculated in the same way, except rather than using the actual percentage complete, the planned percentage complete for each project would be utilized.

Note in an example that initiative completion does not need to be calculated based on the actual values of the target data point (e.g., measuring reduction in Scope 1 emissions toward the target). This is because many factors can influence the target data point that impact the company's overall Scope 1 emissions. If, for example, the company's emissions rise in 2022 despite having completed 5.5% of the initiative, the company may determine that they need to re-baseline their emission reduction goal to account for these increased emissions, and therefore would need to establish additional projects to make up for the gap. Alternatively, if the emissions reductions delivered by projects are not in line with what was expected, then this attribute is auto adjusted in the project to reflect the reduced contribution.

As data quality improves across Environmental, Social, and Governance performance measures, the system may use an AI-enabled measurement and verification approach to measuring actual performance rather than project completion. The application may calculate a Net Present Value of the project by subtracting CapEx, OpEx and Other Costs from the Total Savings, discounting each future year to the present, and summing across all years. In addition, the application calculates the total performance impact of the project, summed over all years. Performance improvements are projected into the future at the value in the final year until the value specified in the "Project Useful Until Year" field. The Net Present Value accounts for the fact that money received (or spent) in the future is worth less than money received (or spent) in the present. This is because money held today can be invested to earn a return; thus, when calculating the value of spending that money on a project rather than investing it, future earnings from that project must be discounted by the rate of return (in the example above, 0.08 representing an 8% annual return) that could have been achieved through the alternative investment. It thus represents the "opportunity cost" of choosing to spend money on the project rather than this reasonable alternative investment.

The formula for calculating the Net Present Value is given below:

$$NPV = \sum_{t=0}^{n} \frac{R_t}{(1+i)^t}$$

Where:
- $R_t$=Net cash inflow or outflow, equal to the Total Savings minus the sum of all expenses (CapEx, OpEx, Other Expenses)
- i=discount rate, a value between 0 and 1
- t=the number of time periods, in this case, in years An example with a discount rate of 0.08 (e.g., a typical value) is given below (e.g., note that the user provides the CapEx, OpEx, Other Costs, Total Savings series as well as the value of the discount rate; all other values are calculated). The NPV is calculated in the year the project starts (2022 corresponds to t=0). Thus, the NPV may be the sum of the discounted cash flow across all years. The application enables dynamic adding to actual completion data on an annual basis in the form of a percentage complete. For example, this value is updated on an annual basis, starting on the planned start date of the project, up until the project is completed.

Initiative performance is measured as the actual initiative completion percentage divided by the planned initiative completion percentage. To calculate the top and bottom performing initiatives, all initiatives are sorted by this quotient. The initiative with the highest value is considered the top performing initiatives, and the initiative with the lowest value is considered the lowest performing initiative. This value is updated when project completion statuses are updated.

The application generates a recommendation, for example, if the following conditions are met: (1) the actual progress on an initiative is less than the planned progress, and/or (2) the initiative has one or more projects pending approval. If these conditions are met, the application can generate a recommendation that suggests the project that has the largest contribution to the initiative completion percentage (e.g., that which delivers the largest performance improvement for one of the data points associated with the initiative).

In some implementations, the application generates pre-populated reporting templates based on a combination of ingested and configuration data. The application may also identify and/or inform (e.g., another system or user) if a report is "on track" or "off track" with respect to being completed prior to its specified deadline. For example, a report is considered "off track" if it has not been advanced to the "Approved" status by the deadline.

In some implementations, based on historical rates of data collection, reviews, and approvals, the AI-based application may project and/or predict whether a report will be completed. In some implementations, the KPI database specifies the relationships that form the edges. Each category will have one or more issues, each issue one or more sub-issues, where each sub-issue is one or more data points. In one implementation, visually identifying and alerting to (1) whether the data point is included in the outline of the report instance, and (2) the status of the data point, indicating whether (a) the data point is configured, (b) data is not available, (c) data is available but out of date, and (d) data is available and current.

Returning to FIG. 1, the computing device 102 may evaluate the data portions (e.g., the data record portions 105, 108, 110) using the ensemble model 124 to identify one or more of the topics 118, 120, 122 present within the data portions. For example, the computing device 102 may receive one or more data records 104 for analysis. In certain implementations, the data records 104 may be received from various data sources, such as different departments within the same company, different software tools, different databases, government agencies, auditing agencies, public data sources, the Internet, and the like. Data records 104 may include any type of digital file containing text or other information. For example, received data records 104 may include text data records, PDF data records, web pages, spreadsheets, emails, news articles, social media content, regulatory disclosures, and the like. In certain instances, multiple data records 104 may be received at the same time for analysis. In further instances, only a single data record 104 may be received for analysis. For clarity in the accompanying discussion, FIG. 1 only depicts a single data record 104, but it may be used to process and analyze multiple data records (e.g., by serially processing each of the data records, by parallel processing multiple data records) as well as other types of data. In certain implementations, the data records 104 may be ingested or otherwise retrieved by the computing device 102 or another computing device. For example, the data records 104 may be ingested by an intake parser, bot, or scraper that is configured to automatically retrieve new data records from one or more sources (e.g., one or more companies, one or more departments within the same company). In certain implementations, the intake parser, bot, or scraper may take data in from the web or retrieve data from one or more publicly available websites, private websites (e.g., intranet web pages), or other web-accessible sources of data.

Data record portions 106, 108, 110 may contain subsets of corresponding data records 104 (such as exclusive subsets of corresponding data records, overlapping subsets of corresponding data records, or both). In certain instances, the computing device 102 may be configured to receive one or more data records 104 and to divide the received data records 104 into a plurality of corresponding data record portions for further analysis, such as analysis by the ensemble model 124. In particular implementations, the data record portions 106, 108, 110 may be generated to contain individual paragraphs or other subsets of text contained within the corresponding data records 104. In certain implementations, prior to splitting the data records 104 into corresponding data record portions 106, 108, 110, the computing device 102 may be configured to recognize text within the data records 104 using one or more text recognition processes, such as optical character recognition.

The ensemble model 124 may be configured to identify which topics 118, 120, 122 are discussed in and correspond to each of the data record portions of the data record 104. For example, the ensemble model 124 may be configured to assign one or more of labels 112, 114, 116 to each of the data record portions 106, 108, 110, where each of the labels 112, 114, 116 correspond to a particular topic of the topics 118, 120, 122. To illustrate, the label 112 may be associated with the topic 118, the label 114 may be associated with the topic 120, and the label 116 may be associated with the topic 122. In an aspect and as explained further below, topics 118, 120, 122 may correspond to particular ESG issues and causes. For example, the topic 118 may correspond to an environmental ESG issue (such as greenhouse gas emissions), the topic 120 may correspond to a sustainability ESG issue (such as use of recycled materials in product manufacturing), and the topic 122 may correspond to a governance ESG issue (such as increasing representation of women in managerial positions within the company). In an aspect, the topics 118, 120, 122 may be set in advance by an organization. In an additional or alternative aspect, the topics 118, 120, 122 may be determined with machine learning algorithms, as discussed herein, based on analysis of the data. It is noted that the topics 118, 120, 122 may be dynamic, rather than static. For example, the topics 118, 120, 122 may be an initial set of topics configured for use by the computing device 102 during analysis in accordance with the concepts disclosed.

In certain implementations, each individual topic 118, 120, 122 may have a corresponding label 112, 114, 116. For example, the topics 118, 120, 122 may be contained within a predetermined list of topics that the ensemble model 124 is configured to recognize within corresponding data record portions 106, 108, 110. Accordingly, the labels 112, 114, 116 may similarly be part of a predetermined list of labels that the ensemble model 124 is configured to assign to data record portions 106, 108, 110. In an aspect, a label may provide a measurement of the extent to which the data record portion discusses the topic. For example, a topic, such as "Topic_1", may be associated with multiple labels, such as "Label_A", "Label_B", and "Label_C". In such an implementation, "Label_A", "Label_B", and "Label_C" may indicate different measurements of the extent to which a data portion (e.g., one of the data record portions 106, 108, 110) discusses "Topic_1", where "Label_A" indicates "Topic_1" is discussed in an associated data portion to a lesser extent than "Label_B" and "Label_C"; "Label_B" indicates "Topic_1" is discussed in an associated data portion to a lesser extent than "Label_C" but to a greater extent than "Label_A"; and "Label_C" indicates "Topic_1" is discussed in an associated data portion to a greater extent than "Label_A" and "Label_B". It is noted that the exemplary labelling techniques described above have been provided for purposes of illustration, rather than by way of limitation and other techniques may be used to apply labels to data record portions to indicate a measurement of the extent to which a particular topic is discussed or represented by a data portion in accordance with the concepts disclosed herein (e.g., numeric values). In certain implementations, one or more of the topics 118, 120, 122 may have more than one corresponding label 112, 114, 116. In certain implementations, the predetermined list of labels and/or the predetermined list of topics may be organized as a taxonomy including groups of related topics/labels. In certain implementations, the ensemble model 124 may determine that a particular data record portion 106, 108, 110 discusses more than one topic.

For example, a particular data record portion (not depicted) may discuss both the topic 120 and the topic 122. In certain implementations, the ensemble model 124 may be configured to apply multiple labels to such data record portions. Continuing the previous example, the ensemble model 124 may apply both the labels 114, 116 to the data record portion. In additional or alternative implementations, the ensemble model 124 may form a composite label that combines labels for each of the two or more discussed topics. Continuing the previous example, the ensemble model 124 may generate a composite label that contains all or part of the labels 114, 116 and may apply the composite label to the data record portion. In such implementations, composite labels may improve the ability to recognize data records that discuss multiple topics separately from data records that discuss multiple topics together. For example, composite labels may accordingly improve distinction between a first data record that discusses environmental topics in a first half of the data records (or first data record portion) and diversity topics in a second-half of the data records (or second data record portion) from a second data record that frequently discusses both environmental topics and diversity topics together throughout the data record or within a single data record portion. Composite labels may be used in combination with the aggregation mentioned previously to identify composite labels in a data record portion where the sub-labels are identified in different sub-portions of the data record portion.

Figure 2:
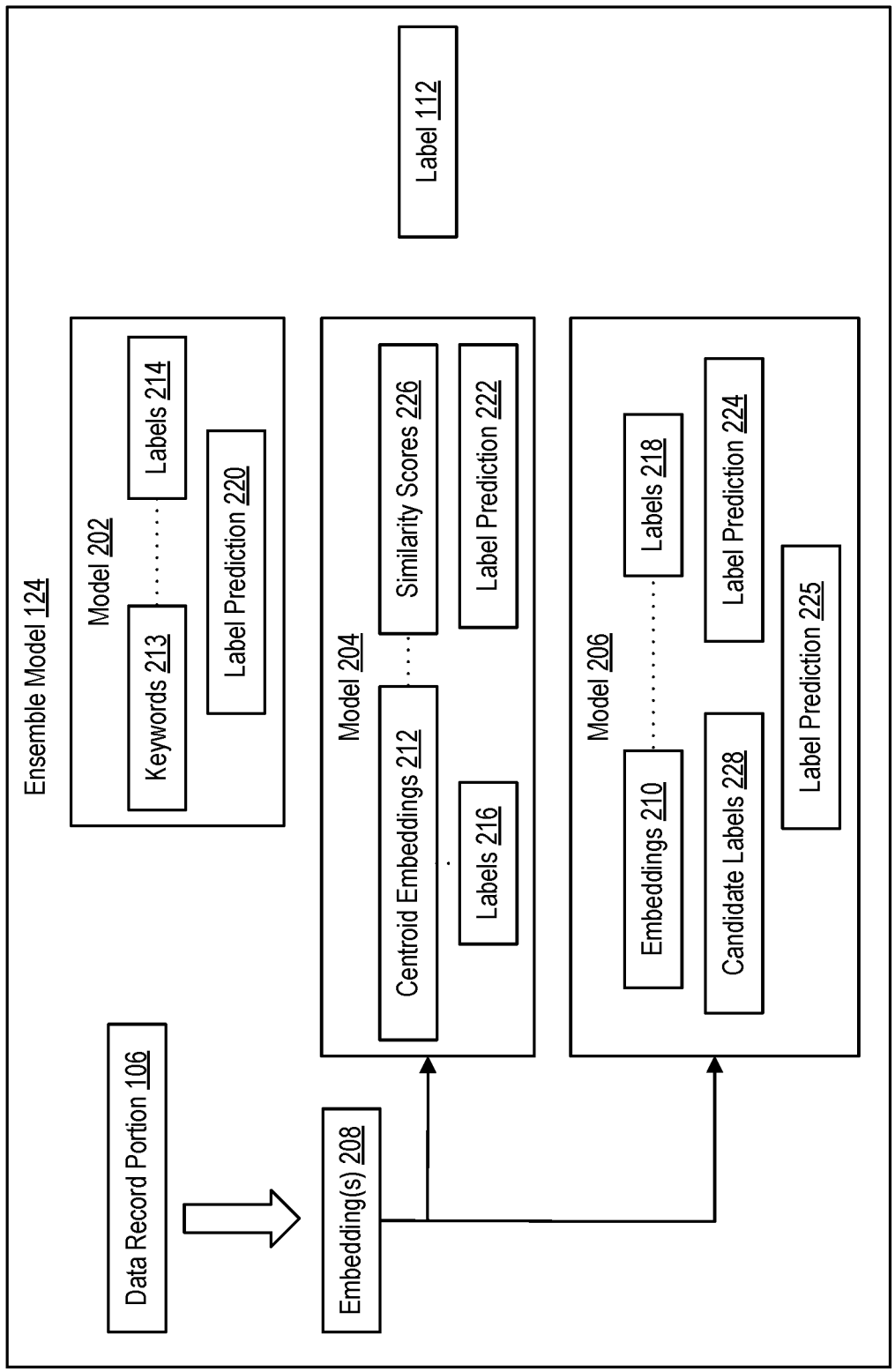
FIG. 2 depicts an exemplary implementation of an ensemble model according to an exemplary embodiment of the present disclosure.

In certain implementations, the ensemble model 124 may combine predictions from one or more models to identify the labels 112, 114, 116. For example, FIG. 2 depicts an exemplary implementation of the ensemble model 124 according to an embodiment of the present disclosure. In particular, FIG. 2 depicts an exemplary application of the ensemble model 124 in which the label 112 is identified and applied to the data record portion 106. As shown in FIG. 2, the ensemble model 124 includes models 202, 204, 206. It is noted that FIG. 2 depicts the ensemble model as utilizing three models for purposes of illustration, rather than by way of limitation and that ensemble models of the present disclosure may use two models or more than three models. The models 202, 204, 206 may use different strategies for generating label predictions 220, 222, 224 for a data record portion, shown in FIG. 2 as the data record portion 106. The data record portion 106 may be received by the ensemble model 124 as an embedding 208. It is noted that embedding 208 may include multiple embeddings corresponding to the data record portion 106. For example, the data record portion 106 may correspond to a paragraph within a data record obtained for analysis (e.g., the data record 104 of FIG. 1) and an embedding may be generated for each sentence in the paragraph, as described in more detail below. Additionally or alternatively, the ensemble model 124 may receive the data record portion 106 and generate the embedding 208 (e.g., as part of a model initialization process).

A data portion, such as the data record portion 106 shown in FIG. 2, may be used to generate multiple different embeddings. For example, two or more embeddings may be generated from the data record portion 106. An embedding generated from a data portion may be provided to all of the models 202, 204, 206 or may be provided to a subset of the models 202, 204, 206. To illustrate, the embedding 208, which was generated based on data record portion 106, may be provided to each of the models 202, 204, 206, but the data record portion 106 may be used to generate a second embedding, which may be provided to only one of the models 202, 204, 206. In an aspect, different techniques may be used to generate multiple embeddings from a data portion.

In certain implementations, the ensemble model 124 may be configured to generate the set of topic scores 130 based on label predictions 220, 222, 224 received from the models 202, 204, 206. The models 202, 204, 206 may use different strategies for generating label predictions 220, 222, 224 for received data record portion 106. In particular, the model 202 is shown as generating the label prediction 220 based on keywords 213 and labels 214. To generate the label prediction 220, the model 202 may be configured to search received data record portion 106 based on the keywords 213. The keywords 213 may be associated with corresponding labels 214 and may specify one or more key terms (or groupings of key terms) that frequently occur within data record portions that discuss particular topics or are associated with particular labels 214. Labels 214 may include the labels 112, 114, 116, and each of the labels 214 may have one or more corresponding keywords 213. It is noted that keywords 213 are not limited to individual words. Keywords 213 may include key terms formed using combinations of individual words, such as through Boolean combinations of words (e.g., at the sentence level, paragraph level, etc.). For example, a first word associated with an energy management issue may have a corresponding word that forms a single key term, such as "energy transition," and may have a keyword that combines several key terms, such as ("fuel" AND "green") OR ("solar" and "sustainable"). The use of key terms, as opposed to being limited to use of individual words, may enable the model 202 to eliminate noise from a dataset, such as the data record portion 106. The word "energy" by itself may not signify anything specific to or related to ESG factors, but using the term "energy transition" may indicate a transition from fossil fuels to lower carbon emission energy sources, thereby providing a nexus to ESG-related factors.

The keywords 213 and corresponding labels 214 may be identified by the model 202 itself and/or may be received from an external source by the model 202. For example, keywords 213 may be received from individuals (i.e., a domain expert, data scientist, etc.) that have read or otherwise reviewed data records in data record portions associated with particular topics and labels, and may manually create corresponding keywords and key term groups based on terms that are frequently used within these data records and data record portions. Additionally or alternatively, a supervised or unsupervised learning model or generative model may be used to determine one or more of the keywords 213. For example, the model 202 may compute a co-occurrence matrix that indicates how many data record portions (such as data record portions with a known corresponding topic or label) contain combinations of particular words or phrases. Groups of key terms with a high level of co-occurrence within corresponding data record portions may be selected as keywords associated with predetermined labels for those data record portions. In certain implementations, key terms selected by the model 202 may be curated or organized by one or more human-directed or automated computing processes. Sets of keywords 213 and corresponding labels 214 may then be stored within the model 202 for future use and/or may be received by the model 202 (e.g., along with the one or more data records 104) for analysis by the computing device 102. For example, in certain implementations, one or more external databases may maintain copies of keywords 213 and corresponding labels 214, which may be periodically updated or changed.

After receiving the data record portion 106, the model 202 may search for the keywords 213 within the data record portion 106. The label prediction 220 may then be determined based on the results of these searches within the data record portion 106 for the keywords 213. For example, the label prediction 220 may be determined based on one or more labels 214 corresponding to identified keywords 213 within the data record portion 106. In particular, if the data record portion 106 contains one or more of the keywords 213, the model 202 may identify one or more corresponding labels 214 for the identified keywords 213. In certain implementations, the model 202 may be configured to identify a single label 214 for each received data record portion 106. In such instances, the model 202 may be configured to identify the label prediction 220 as the label 214 that most frequently has corresponding keywords 213 identified within the data record portion 106. In additional or alternative implementations, the model 202 may be configured to identify multiple labels within the label prediction 220. In such instances, the model 202 may identify a predetermined number of labels 214 (such as the top two labels, the top three labels, and the like) and/or may include multiple labels that occur more than a predetermined number of times within the data record portion 106 (such as labels with three or more corresponding keywords within the data record portion 106), or labels matching the Boolean logic of keywords 213.

Each keyword 213 may be associated with a label and the labels applied to a data portion may be based on identification of the corresponding keyword within a data portion. As a non-limiting example, if the keywords 213 included 30 keywords or key terms, the model may be configured to apply 30 labels (i.e., one label for each keyword or key term) to data portions, and a single data portion may become associated with all 30 labels if all 30 keywords or key terms are detected within the data portion. It is to be noted however, that, as explained above, in some aspects the labels may also indicate the extent to which a particular topic is present in a data portion. Accordingly, it should be appreciated that the labels may not merely indicate the presence of a keyword or key term within a data portion and may instead provide information that indicates the intensity or degree to which particular topics associated with one or more keywords or key terms are present in a data portion.

In certain implementations, the ensemble model 124 may be configured to generate one or more embeddings 208 based on a received data portion, such as the received data record portion 106. The embedding(s) 208 may be generated as an embedding vector based on the contents of the data record portion 106. In certain implementations, one or both of the models 204, 206 may be configured to use the embedding 208 (such as in lieu of receiving the data record portion 106). The embedding 208 may be generated based on the contents of the data record portion 106 and represents the contents of the data record portion 106 in a lower-dimensional space than simply copying the text from the data record portion 106 itself. In particular, the embedding 208 may be generated by a machine learning model, such as a transformer model. For example, in certain implementations, the embedding 208 may be generated using a Bidirectional Encoder Representations from Transformers (BERT) model. The embedding 208 may then be analyzed by the models 204, 206 to determine the label predictions 222, 224.

For example, the model 204 includes centroid embeddings 212, which may be used to compute scores 226 for the data record portion 106 based on the embeddings 208. The scores 226 may be used to associate one or more of the labels 216 with the data record portion 106 corresponding to the embeddings 208, where the one or more labels associated with the data record portion 106 are output by the model 204 as a label prediction 222. To illustrate, the centroid embeddings 212 may represent embeddings (such as embeddings generated using the same model that generated the embedding 208) generated based on predetermined data record portions with known corresponding labels 216. For example, each of the labels 216 may have one or more corresponding centroid embeddings 212 generated based on one or more corresponding data record portions (such as data record portions from training data). In certain implementations, the labels 216 may be similar to or identical to the labels 214. The model 204 may then compute the scores 226 for the embeddings 208 based on the centroid embeddings 212. In particular, the similarity scores 226 may be computed to measure or indicate a similarity of the embedding 208 to the centroid embeddings 212. In various implementations, the similarity score 226 may be computed as a cosine similarity measure between the embedding 208 and the centroid embeddings 212, a distance measure between the embedding 208 and the centroid embeddings 212, and the like. Similarity scores may also be computed using an unsupervised or supervised machine learning model. For example, a machine learning model can be trained to identify data record portions that discuss the same topic, and quantitative predictions from such a model may be used as a similarity metric to determine the similarity of a data record portion to a centroid. In this way, similarity scores can be improved as more explicit labels are given. However, quality of such scoring can vary depending on an amount of training data available, and so with smaller amounts of training data the scoring may be less accurate, but will grow more accurate over time as the number of labels increases. When there are multiple centroid embeddings for a single topic, the similarity of the data record portion to the centroid embeddings may be calculated as the maximum similarity of the data record portion to any of the centroid embeddings, as the average, or another technique. It is noted that determining the scores 226 in the manner described above provides the technical advantage of enabling the model 204 to determine identify one or more topics associated with the centroid embeddings 212 that are similar to content represented by the embeddings 208 without having to account for the structure and arrangement of individual words within the data record portion 106 (e.g., whether keywords or key terms appear at particular locations or in a particular order within a data record portion).

The model 204 may then generate the label predictions 222 based on the scores 226. For example, the label prediction 222 may be determined based on one or more labels 216 corresponding to the centroid embeddings 212 with the highest scores 226. For example, the model 204 may be configured to identify a single label 216 for each received data record portion 106. In such instances, the model 204 may be configured to identify the label prediction 222 as the label 216 associated with the centroid embedding having the highest corresponding score 226. In additional or alternative implementations, the model 204 may be configured to identify multiple labels within the label prediction 222. In such instances, the model 204 may identify a predetermined number of labels 216 (such as the top two labels, the top three labels, and the like) with the highest similarity scores 226 and/or may include multiple labels 216 with similarity scores 226 that exceed a predetermined threshold.

The model 206 includes embeddings 210, labels 218, candidate labels 228, and the label prediction 224. In particular, the model 206 may be configured to identify one or more embeddings 210 that are the nearest neighbors to or most closely resemble the embedding 208. In certain implementations, the embeddings 210 may be identified from among a predetermined set of embeddings, such as or similar to the centroid embeddings 212. The embeddings 210 identified as nearest neighbors for the embedding 208 may be identified by a machine learning model, such as a nearest neighbor model. In additional or alternative implementations, the nearest neighbor embeddings 210 may be identified as embeddings 210 with the highest similarity measure with the embedding 208. For example, the model 206 may identify the embeddings 210 based on the similarity scores 226 (or similar similarity measures). The embeddings 210 may be associated with one or more labels 218, similar to the labels 214, 216.

The model 206 may identify one or more candidate labels 228 based on the identified embeddings 210. In particular, the candidate labels 228 may be identified as all labels 218 for which at least one corresponding embedding is contained within the identified nearest neighbor embeddings 210. The label prediction 224 may then be identified based on the candidate labels 228. For example, the label prediction 224 may be identified based on a number of times corresponding embeddings were identified within the nearest neighbor embeddings 210 for each of the candidate labels 228. In instances, two or more of the embeddings 210 may correspond to the same label from the labels 218. In such instances, the model 206 may determine how many of the embeddings 210 correspond to each of the candidate labels 228 and may select the label or labels with the most corresponding embeddings 210 for inclusion within the label prediction 224. For example, the model 206 may be configured to identify a single candidate label 228 for each received data record portion 106. In such instances, the model 206 may be configured to identify the label prediction 224 as the candidate label 228 associated with the largest quantity of embeddings 210. In additional or alternative implementations, the model 206 may be configured to identify multiple labels within the label prediction 224. In such instances, the model 206 may identify a predetermined number of candidate labels 228 (such as the top two labels, the top three labels, and the like) with the most corresponding embeddings 210 and/or may include all of the candidate labels 228 with more than a predetermined threshold of corresponding nearest neighbor embeddings 210. The label prediction could also be based on probabilistic measures, such as using Bayesian likelihood.

It is noted that in the exemplary operations described above, the candidate labels 228 could be generated by subject matter experts, independent human labelers, or an additional machine learning or rule-based model, such as model 202. These candidate labels may, at least initially, include errors or inaccuracies. However, model 206 can still learn from candidate labels 228 despite the inaccuracies. The ability to use inaccurate ("weak") candidate labels can provide better downstream model performance because it is easier for developers to generate many weak labels than to generate an equivalent number of "true" labels generated by subject matter experts. In both cases, these candidate labels are used in the same way. Model-generated or "weak" labels must meet a quality standard such that they are sufficiently accurate to generate downstream predictions, but need not be fully accurate. The presence of weak labels is valuable to guarantee sufficient data for model 206.

The candidate labels 228 may also be missing for some topics or data records. Conventional machine learning approaches with existing models cannot make use of incomplete label sets. An example aspect of this disclosure is a novel extension to multilabel k nearest neighbors (MlKnn) algorithm that enables the model to make use of incomplete label sets.

In certain implementations, the model 206 (or another model) may determine a label prediction 225 based on one or more keyword searches of the nearest neighbor embeddings 210. For example, the model 206 may perform a keyword search within each of the embeddings 210, such as a keyword search based on the keywords 213. In such instances, the model 206 may perform one or more searches (such as Boolean searches) for the keywords 213 using techniques similar to those discussed above in connection with the model 202. In such instances, the labels 218 may instead correspond to labels (e.g., selected from the labels 214) that are associated with the keywords 213 identified within the embeddings 210. In such instances, the label prediction 225 may be identified based on how frequently each of the labels 218 are identified within the embeddings 210 based on corresponding keywords. For example, the model 206 may be configured to identify a single candidate label 228 for each received data record portion 106. In such instances, the model 206 may be configured to identify the label prediction 225 as the label 218 with the most frequently identified keywords 213 within the embeddings 210. In additional or alternative implementations, the model 206 may be configured to identify multiple labels within the label prediction 225. In such instances, the model 206 may identify a predetermined number of labels 218 (such as the top two labels, the top three labels, and the like) with the most corresponding keywords 213 identified within the embeddings 210 and/or may include all of the candidate labels 228 with more than a predetermined threshold of corresponding nearest neighbor embeddings 210. As one specific example, the label prediction 225 may be identified to include labels associated with at least a predetermined percentage (e.g., 5%, 10%, 25%) of the keywords 213 identified within the embeddings 210.

The ensemble model 124 may be configured to determine the label 112 based on the label predictions 220, 222, 224, 225 received from or generated by the models 202, 204, 206. In certain implementations, the label 112 may be generated to contain all of the label predictions 220, 222, 224, 225. In additional or alternative implementations, the label 112 may be generated based on a combination of all or part of the label predictions 220, 222, 224, 225. For example, the label 112 may be generated as a Boolean combination of the label predictions 220, 222, 224, 225. In one particular implementation, the label 112 may be generated to include labels that (i) occur in both the label prediction 220 and the label prediction 225 or that (ii) occur in both the label prediction 222 and the label prediction 224. As another particular example, the label 112 may be generated to include the labels that occur most frequently within the label predictions 220, 222, 224, 225.

Utilizing multiple models 202, 204, 206 that are then synthesized by the ensemble model 124 may enable increased accuracy for labels 112, 114, 116 determined by the ensemble model 124 without requiring substantial increases in training time or training data. In particular, rather than utilizing significant amounts of computing power and training data to train a single model (such as a deep learning model) to individually identify the labels 112, 114, 116, the ensemble model 124 may combine two or more smaller models to achieve similar levels of accuracy. This can improve processing time and decrease computing hardware requirements, as smaller models are able to execute more easily on lower powered computing devices. Additionally, this may reduce the deployment costs to initially configure and/or update the ensemble model 124.

Returning to FIG. 1, the computing device 102 and/or the ensemble model 124 may determine one or more topic scores 130 based on the labels 112, 114, 116. In certain implementations, the topic scores 130 may be computed for each of the topics 118, 120, 122 associated with labels 112, 114, 116 identified within the data record portions 106, 108, 110. In particular, the topic scores 130 may be computed to indicate how frequently or how significantly the topics 118, 120, 122 were discussed within the data record 104. In certain implementations, the topic scores 130 may be computed as a number of times in which labels 112, 114, 116 associated with corresponding topics 118, 120, 122 were identified by the ensemble model 124 for data record portions 106, 108, 110 from the data record 104. In additional or alternative implementations, the topic scores 130 may represent a percentage of the paragraphs or data record portions 106, 108, 110 in which corresponding labels 112, 114, 116 were identified. In still further implementations, the topic scores 130 may be computed using one or more additional techniques (such as comparisons to predetermined thresholds, comparisons to an expected number of corresponding labels, machine learning models trained to generate topic scores 130, and the like). In certain implementations, topic scores 130 may be computed for all labels 112, 114, 116 and corresponding topics 118, 120, 122 identified within the data record portions 106, 108, 110. In additional or alternative implementations, the topic scores 130 may be calculated only for topics 118, 120, 122 that meet one or more predetermined criteria. For example, topic scores 130 may only be computed for a predetermined number of topics 118, 120, 122 (such as the top topic, the top three topics, the top five topics, the top ten topics, and the like). As another example, topic scores 130 may only be computed for topics that receive a minimum threshold number of identified labels (e.g., three or more identified labels, five or more identified labels, 10 or more identified labels). As a further example, topic scores 130 may only be computed for topics that receive a minimum percentage of the identified labels (such as at least 5% of the identified labels, at least 10% of the identified labels, at least 20% of the identified labels).

The computing device 102 may be configured to generate data record scores 128 for received data records 104. The data record scores 128 may be computed for at least one of the topics 118, 120, 122 with corresponding labels 112, 114, 116 identified by the ensemble model 124. The data record score 128 may be determined to indicate a priority for one or more topics 118, 120, 122 discussed within the data record 104, such as a relative prioritization between topics discussed within the data record 104 for a corresponding entity (e.g., a corresponding company). In certain implementations, a raw topic score can be generated as the percentage of paragraphs of the data record (e.g., data portions of a data item) for which a positive label is generated. A beta distribution may be fit to these raw topic scores for each data record type for all data records in a training set. At inference time, all data record-topic raw topic scores are transformed by this distribution to generate a final topic score.

In certain implementations, the computing device 102 may generate the data record scores 128 based on the topic scores 130. For example, the data record score 128 may be generated to include the topic scores 130. In certain implementations, the topic scores 130 may be adjusted or normalized to generate the data record score 128. For example, topic scores 130 associated with particular topics 118, 120, 122 may be compared to topic scores from similar types of data records 104 (such as data records from the same entity, from a different entity, and combinations thereof). The topic scores 130 may then be adjusted based on the previous documents (e.g., normalized based on a typical topic score for the associated topic or for the associated type of document or type of data). In certain implementations, higher topic scores 130 and/or higher document scores 128 may indicate that a particular associated topic has a higher priority of discussion within the document 104. In an aspect, in addition to generating document scores, information associated with the document portions that most influenced those scores may also be provided or presented to a user. This will allow the user or an organization to explore the document and understand the content that led to the resulting document score. As an illustrative and non-limiting example, an augmented version of the document may be generated and presented or provided to a user that shows the topic scores for each document portion within the document, such as in the margin next to each paragraph of a document.

In various implementations, the document score 128 and/or the topic scores 130 may be further analyzed to generate particular outputs. In certain implementations, the document score 128 (individually or in combination with document scores for other documents) may be used to update or create time series data 136. The time series data 136 may represent relative priorities of the topics 118, 120, 122 over time for an entity associated with the document 104. In particular, the time series data 136 may include scores 138, 140, 142 from previously-analyzed documents associated with the same entity (such as the same company or organization). In such instances, the document score 128 may be added to the time series data 136 to represent a current or updated set of priorities for the topics 118, 120, 122. For example, an updated score may be computed based on the document score 128 and a most recent score 142 from the time series data 136. In certain instances, the influence of previous documents on scores 138, 140, 142 may change over time. For example, computing the scores 138, 140, 142 may include applying a scaling factor, a half-life decay, or both to previous document scores when computing a current or updated score. In an aspect, the scaling factors and half-life decay values may differ by data types (e.g., different documents types may have different scaling and half-life decay values) or organization types. In still further implementations, the document scores 128 may be normalized before being combined to form the scores 138, 140, 142 for the time series data 136.

For example, quantile transformation may be applied to the document scores based on document types for corresponding documents 104, or different types of stakeholders (such as investors, customers, and management). In certain implementations, scores may be separately computed for the time series data 136 for each topic. For example, if any of the labels identified by the ensemble model 124 are composite labels that correspond to multiple topics, the computing device 102 may be configured to separate the composite label into two corresponding topics for the purposes of calculating the document score 128, the topic scores 130, the scores 138, 140, 142, and combinations thereof. In still further implementations, certain topic scores 130, document scores 128, and/or time series scores 138, 140, 142 may be calculated (separately or additionally) for composite issues or paragraphs that discuss multiple topics. In this manner, the time series data 136 may reflect, quantify, or otherwise indicate how priorities between various ESG topics change for a corresponding entity over time (such as when particular topics are prioritized as part of one or more initiatives within the company). Additionally or alternatively, the time series data 136 may indicate an increasing general priority of all ESG topics within communications and other documents published, stored, or created by the entity.

Topic scores can be used downstream to determine which documents should be passed into a Generative AI model, e.g., a RAG framework (retrieval augmented generation) to generate additional insights or summaries using the documents that were identified as discussing a particular topic. For example, insights can be created such as: "how has discussion of climate change differed between documents before and after Jan. 1, 2022?"; "what are my investors saying about diversity, equity, and inclusion?"; "what financial risks were identified for companies in my sector in relation to biodiversity loss?" etc. Performing the topic scoring process and filtering document text based on these scores prior to passing the text into a generative model provides the advantage of improved result precision and better relevance of results, relative to not using this method. The resulting insights can also be turned into additional scores. For example, a generative large language model can be asked the query "provide a score from 0 to 100 for the level of financial risk of the company in relation to biodiversity loss", given the set of documents or data records with topic scores for "biodiversity" above a set threshold. These scores could be combined with the topic scores for downstream analysis.

Topic scores can be used in conjunction with named entity recognition (NER) to identify discussion of topics in relation to a particular entity, for example, a particular organization, company, geographic location, etc. Therefore, downstream applications can determine, for example, that a given document discusses digital transformation in relation to C3 AI, rather than only digital transformation in the general sense. Scores can be generated measuring the extent to which topics are discussed in relation to particular target organizations. Discussion of particular topics in relation to target organizations can also be measured for the strength of their positive or negative sentiment As described in the preceding paragraph, topic scores plus named entity recognition results can also provide input to retrieval augmented generation models, to generate text-based insights summarizing or analyzing a set of text content that discusses a set of content in relation to a set of organizations, and subject to any other filters (e.g. date, publisher, etc.).

In certain implementations, the computing device 102 may generate one or more recommendations 132 based on the document score 128. To illustrate, the document score 128 can form the basis for a recommendation both to (1) improve performance on a topic through initiatives/projects, and/or (2) ensure reporting on the topic reflects the insights gained from the topic score AND extracted excerpts from the source documents. For example, recommendations 132 may be calculated for one or more initiatives associated with the same entity as the document 104. As explained further below, initiatives may have one or more associated topics. In such instances, the recommendations 132 may be computed by comparing document scores 128 for one or more of the associated topics to an expected document score or priority for the associated topics. If differences exist, the recommendations 132 may identify particular corresponding topics for improvement. In such instances, the recommendations 132 may be configured to improve performance of at least one factor, goal, task, or combination thereof associated with the initiative. In further implementations, an initiative may be identified based on the analysis of the document 104 (alone or in combination with other documents), and progress for the initiative may be updated based on subsequent document scores 128. For example, the document 104 may identify factors corresponding to an initiative or may be received from a data source associated with a particular initiative. In such instances, progress for one or more targets associated with the initiative may be updated based on the document scores 128. For example, targets may include getting particular topics to be a higher priority for an organization that created the document 104, and updating the progress may include indicating that a priority of the corresponding topic has increased or decreased relative to the target. In certain implementations, one or more actions may be executed in response to the recommendation 132.

The computing device 102 or another computing device may generate one or more communications indicating progress towards a particular initiative. Executed actions may include assigning working time, computing power, financial resources, and the like to a particular initiative (such as an initiative that is behind pace compared to one or more associated targets). Additionally or alternatively, the executed actions may include applying one or more artificial intelligence (AI) applications to generate action items for improving progress of a particular initiative. For an initiative designed to offset carbon emissions, the executed actions may include executing an AI-powered inventory management or logistics application to identify ways in which inventory management and logistics operations can be modified to reduce carbon emissions. The outputs of the application may be added to the initiative and communications may be transmitted to appropriate personnel to implement the optimizations to reduce carbon emissions, thereby advancing the initiative.

The recommendations 132 may be generated to indicate one or more ESG topics that should be prioritized. For example, an operating company may perform the above analysis on documents received from or published by various investors or investing firms. In such instances, the document scores 128 or time series data 136 may identify which ESG topics are prioritized by investors (such as investors overall or particular investors or investing firms). Prioritized topics may then be compared against ESG topic priorities for the operating company (such as priorities determined using the techniques discussed above) to identify one or more differences between ESG topics prioritized by the operating company and ESG topics prioritized by the investors. The recommendations 132 may then be generated to indicate one or more ESG topics that should be prioritized further or less prioritized by the operating company, based on investor preferences and expectations.

Computing device 102 or another computing device may receive one or more additional documents that include requests for information. Requests for information may be received from auditors, investors, customers, or other interested parties. The ensemble model 124 or one or more additional machine learning models may be applied to the received request for information to identify which topics information is being requested for. After identifying these topics, the computing device 102 or another computing device may identify (such as based on corresponding document scores 128) documents 104 that contain information regarding the requested topics. In certain implementations, the computing device 102 may extract the requested information from the identified documents 104 and may generate an initial response that contains information pertinent to a received request for information, as discussed above. In still further implementations, the report 134 may be generated without receiving any request for information.

Computing device 102 may be further configured to generate a report 134 based on the document scores 128, a request for information, the time series data 136, and combinations thereof. Report 134 may be generated (by the computing device 102 or another computing device) based on reporting standards (such as internal reporting standards for an organization or external reporting standards for a particular ESG issue or organization). A data model may specify which types of information need to be included in reports that comply with the reporting standards. In such instances, the computing device 102 may generate the report 134 based on the data model to comply with the reporting standards. The report 134 may then be forwarded to one or more interested parties or other computing systems.

In certain implementations, the computing device 102 may be further configured to define an asset hierarchy model 126. The asset hierarchy model 126 may be configured to determine and maintain one or more metrics 144 associated with one or more topics 118, 120, 122 and/or initiatives. In particular, determining the metrics 144 may include aggregating reported data points or metrics from across multiple facilities, departments, regions, and other locations in which an organization operates. For example, the asset hierarchy model 126 may be configured to aggregate emissions data determined for multiple facilities within an organization (e.g., based on documents received from the organization) into a single greenhouse gas emission output data point for the organization as a whole. In certain implementations, the metrics 144 are aggregated into an appropriate output format, such as an evidence package, a report, a dynamic dashboard, an instruction set, an inquiry response, or combinations thereof.

Figure 3:
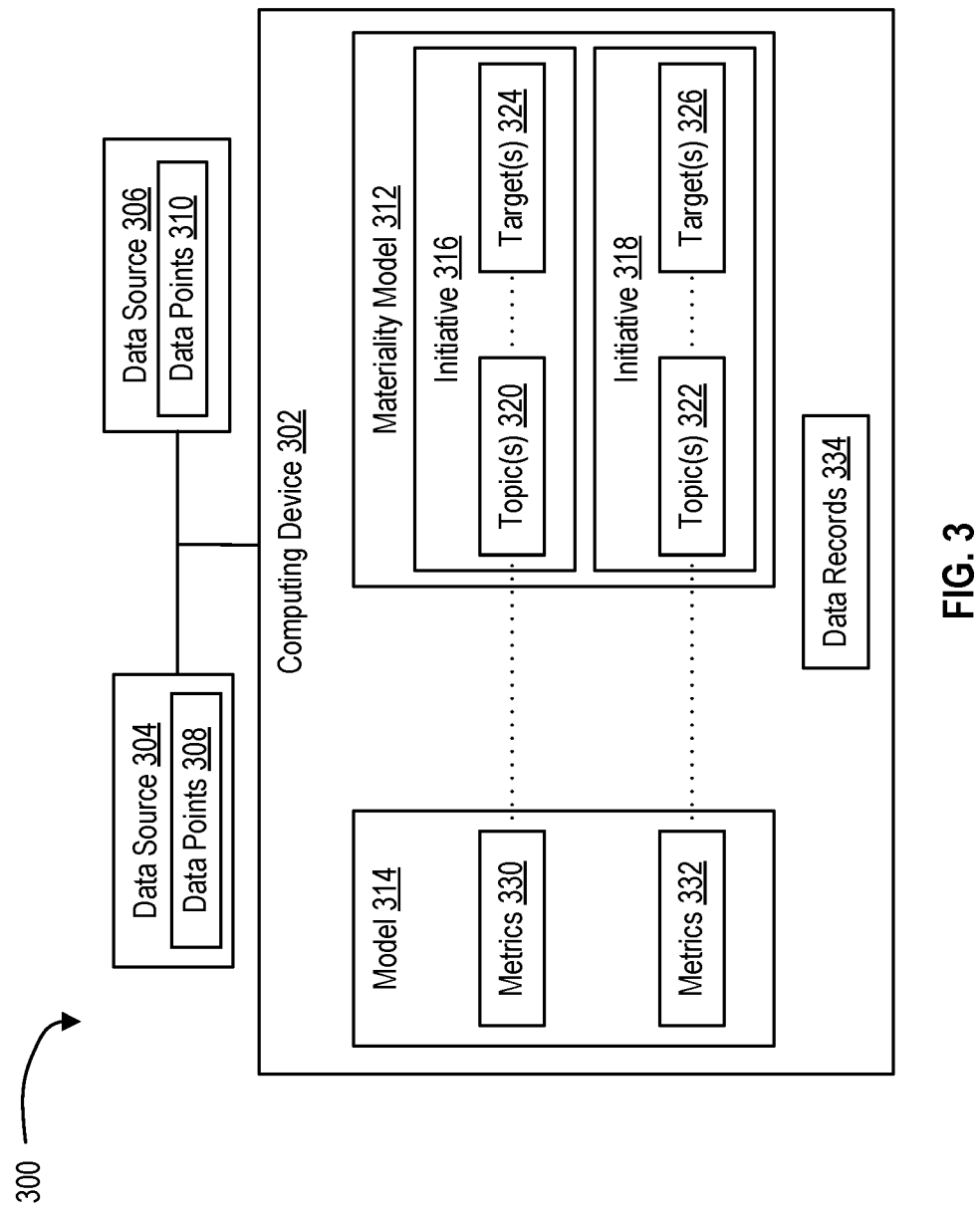
FIG. 3 depicts a system for tracking organizational progress amongst one or more initiatives according to an exemplary embodiment of the present disclosure.

FIG. 3 depicts a system 300 for tracking organizational progress amongst one or more initiatives according to an exemplary embodiments of the present disclosure. The system 300 includes data sources 304, 306, and a computing device 302. The computing device 302 may be an exemplary implementation of a computing device 102 and/or may be a separate computing device. It is noted that while two data sources are shown in FIG. 3, it should be understood that such data sources are shown for purposes of illustration, rather than by way of limitation and that more than two or less than two data sources may be utilized in accordance with the concepts described herein. The computing device 302 may be configured to receive certain data points 308, 310 from the data sources 304, 306. In particular, the data sources 304, 306 may include one or more internal asset data sources and one or more external data sources. An internal data source may be a data source that contains data generated by or associated with particular ESG initiatives and an external data source may be a data source that contains data generated by or associated with a different or third party entity. For example, the data source 304 may be an internal data source and the data source 306 may be an external data source. As explained further below, the data sources 304, 306 contain data points 308, 310. In certain implementations, the data points 308, 310 may include documents, such as the document 104 of FIG. 1. In additional or alternative implementations, the data points 308, 310 may include data tables, data values, or other types of data, such as data derived from one or more documents. In certain implementations, the data sources may contain multiple types of documents. For example, the internal data source 304 may contain multiple types of documents, such as documents from multiple departments or concerning multiple ESG topics.

The computing device 302 includes a materiality model 312, a model 314, and documents 334. The materiality model 312 may be configured to identify corresponding information regarding one or more initiatives 316, 318. For example, the materiality model 312 may identify one or more topics 320, 322 that are material to each initiative 316, 318. Initiatives may represent a specific set of defined goals or activities to be performed by or on behalf of a particular entity or organization. In particular, the initiatives 316, 318 may be performed, monitored or otherwise created for the organization to make progress towards one or more ESG topics. Specific goals or activities may be identified within one or more targets 324, 326 associated with each of these topics 320, 322. For example, the targets 324, 326 may identify one or more operational metrics that define completion of all or part of the initiative 316. Certain topics 320, 322 may have a single associated target, while other topics may have multiple associated targets. Example targets 324, 326 may include a particular quantity or percentage reduction in greenhouse gas emissions, reducing on-site injuries by a specified amount, improving representation of women or minorities within managerial roles to a specified proportion, reduced pollution by a specified amount, and the like. Various organizations may have one or more initiatives 316, 318. The materiality model 312 may, in certain implementations, be configured to maintain information regarding each of the initiatives 316, 318. In additional or alternative implementations, separate materiality models may be used for one or more of the initiatives 316, 318.

The computing device 302 may be configured to analyze data from the data sources 304, 306 to identify data points 308, 310 that are related to the initiatives 316, 318. For example, the computing device 302 may analyze data from the data sources 304, 306 to identify data points 308, 310 that concern one or more of the topics 320, 322 associated with the initiatives 316, 318. Data points 308, 310 may contain documents, such as documents for analysis by the system 100 or documents that have been previously analyzed (e.g., system 100 of FIG. 1). In such instances, the computing device 302 may identify documents that are related to the topics 320, 322. Data points 308, 310 may include document scores 128 for one or more documents, and the computing device 302 may identify the documents related to the topics 320, 322 as documents whose document score 128 contain an indication of the topics 320, 322. In certain implementations, the data points may further include one or more of issues related to the one or more associated topics 118, 120, 122, goals related to the one or more associated topics 118, 120, 122, sub-issues for one or more issues related to the one or more associated topics 118, 120, 122, a measurement metric related to the one or more associated topics 118, 120, 122, a performance measure related to the one or more associated topics 118, 120, 122. In such instances, the data points 308, 310 may include identifiers of the associated topics, and related data points 308, 310 may be identified as data points associated with one of the topics 320, 322.

The computing device 302 may be configured to select a corpus of documents 334 relevant to a specified initiative. The corpus of documents 334 may include one or more documents that relate to the specified initiative (such as one or more topics 320, 322 associated with the specified initiative 316, 318 within the material model 312). The corpus of documents 334 may be selected from among the data from disparate data sources 304, 306, such as by selecting from among one or more documents 334 contained within the data points 308, 310.

The computing device 302 may configure a model 314 to determine metrics 330, 332 for at least a subset of the associated topics 320, 322 based on the corpus of documents 334. The metrics 330, 332 may reflect a relevance measure or a priority measure of one or more of the associated topics 320, 322 within the documents 334. Metrics 330, 332 may be computed as topic scores 130 and/or document scores 128 for the associated topics 320, 322 in the documents 334. In such instances, the metrics 330, 332 may be calculated using the techniques discussed above in connection with the topic scores 130 and document scores 128. Metrics 330, 332 may include one or more additional or alternative scores or metrics. For example, the metrics 330, 332 may include an initiative score that measures or predicts how prevalent actions furthering a specified initiative are within the activities of an associated entity for the specified initiative. For example, the initiative score may be calculated to indicate levels of activity or personnel that advance the corresponding initiative 316, 318, a proportion of publicly identified activities that correspond to the initiatives 316, 318, and/or compliance with various requirements or targets 324, 326 of the initiative 316, 318. The metrics 330, 332 may include a performance score determined to indicate a contribution of a corresponding initiative 316, 318 to overall performance for one or more topics 320, 322 or issues associated with the initiative 316, 318. Metrics 330, 332 may include a benchmark score determined to compare how effectively an entity associated with the documents 334 is progressing with a specified initiative 316, 318 (such as with one or more topics 320, 322 or targets 324, 326 associated with the initiative 316, 318) compared to other related entities (such as similar businesses with similar initiatives 316, 318 or in similar industries).

In certain implementations, determining the metrics may include determining, within the data points 308, 310 and/or the documents 334, spending data associated with the specified initiative 316, 318. The spending data may reflect spending activity for a first entity associated with the specified initiative 316. The computing device 302 may then compare the spending data with spending data associated with a second entity (e.g., a different entity implementing a same or similar initiative 316, 318. Based on this comparison, the computing device 302 may determine a benchmark score for one or both of the entities. For example, the benchmark score may reflect progress along one or more targets 324, 326 relative to a total spending amount for the first or second entity. As another example, the benchmark score may reflect total spending by the entities towards the initiatives 316, 318.

In certain implementations, one or more of the models 124, 202, 204, 312, 314 discussed above may be implemented as machine learning models. For example, the models 124, 202, 204, 312, 314 may be implemented as one or more machine learning models, including supervised learning models, unsupervised learning models, other types of machine learning models, and/or other types of predictive models. For example, the models 124, 202, 204, 312, 314 may be implemented as one or more of a neural network, a transformer model, a decision tree model, a support vector machine, a Bayesian network, a classifier model, a regression model, and the like. The models 124, 202, 204, 312, 314 may be trained based on training data to perform the above-described operations. For example, one or more training datasets may be used to train the models 124, 202, 204, 312, 314. The training datasets may specify one or more expected outputs for the models 124, 202, 204, 312, 314. Parameters of the models 124, 202, 204, 312, 314 may be updated based on whether the models 124, 202, 204, 312, 314 generate correct outputs when compared to the expected outputs. In particular, the models 124, 202, 204, 312, 314 may receive one or more pieces of input data from the training data sets that are associated with a plurality of expected outputs. The models 124, 202, 204, 312, 314 may generate predicted outputs based on a current configuration of the models 124, 202, 204, 312, 314. The predicted outputs may be compared to the expected outputs and one or more parameter updates may be computed based on differences between the predicted outputs and the expected outputs. In particular, the parameters may include weights (e.g., priorities) for different features and combinations of features for received input data. The parameter updates the models 124, 202, 204, 312, 314 may include updating one or more of the features analyzed and/or the weights assigned to different features or combinations of features (e.g., relative to the current configuration of the models 124, 202, 204, 312, 314).

Output generated or stored by the systems 100, 300 may be auditable and traced. By utilizing document scores 128 and topic scores 130 to identify which documents discuss particular topics and initiatives, the systems 100, 300 may enable documents 104, 334 that provided data included within or used to generate reports or other outputs to be expressly identified. Where the computing devices 102, 302 are configured to automatically generate particular outputs, the computing devices 102, 302 may be further configured to include identifiers (such as within metadata for the generated outputs) that identify which documents were used in generating the output.

Figure 4:
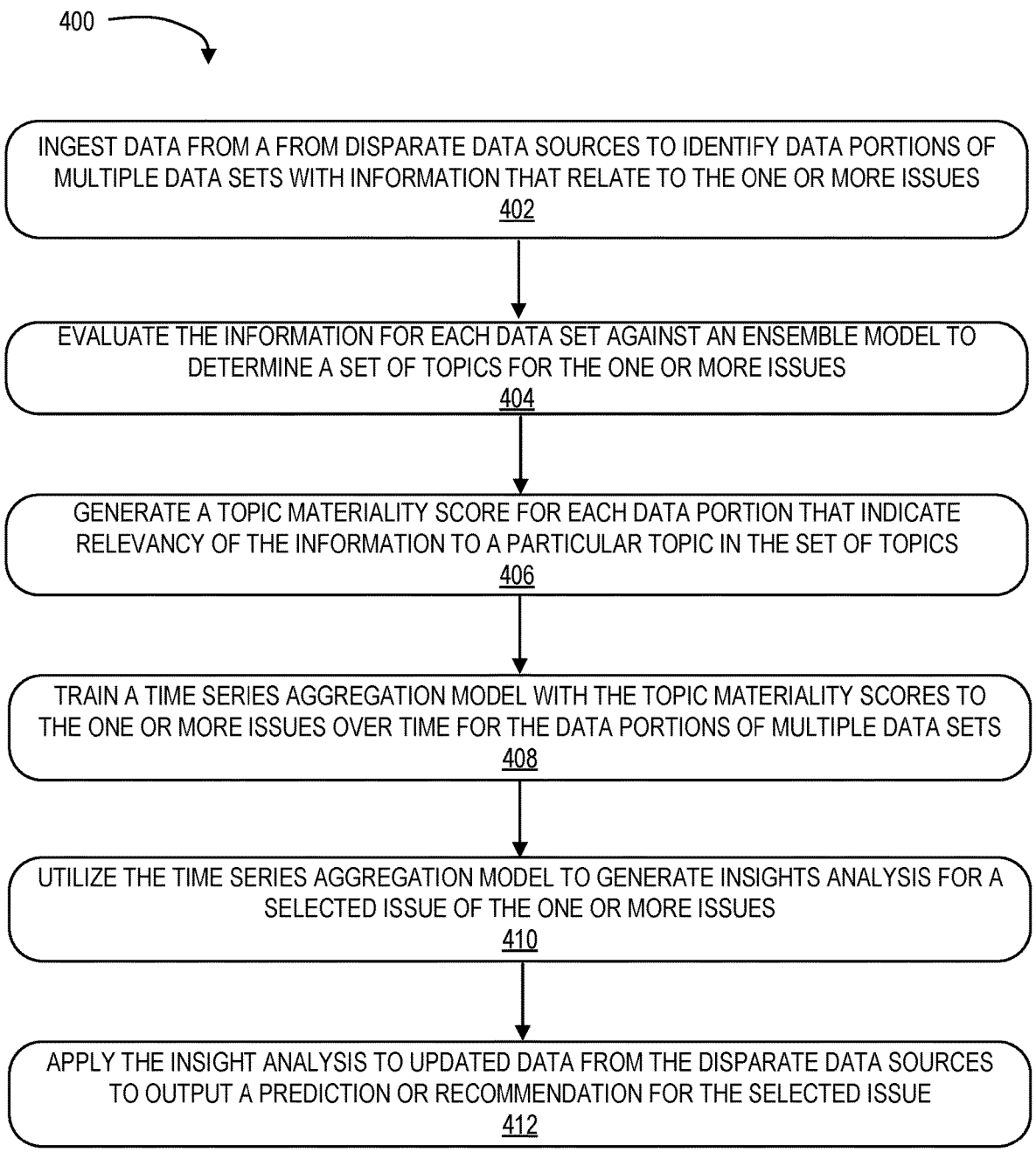
FIG. 4 depicts a method for receiving and processing data records to identify associated ESG discussions according to an exemplary embodiment of the present disclosure.

FIG. 4 depicts a method 400 for receiving and processing data records (e.g., documents) to identify associated ESG discussions according to an exemplary embodiment of the present disclosure. The method 400 includes evaluating information associated with a set of document portions from documents to generate topic scores (block 402). For example, the computing device 102 may evaluate information associated with a set of document portions 106 from a corpus of documents 334 against an ensemble model 124 to generate a set of topic scores 130. In certain instances, the ensemble model 124 may be configured to assign a plurality of labels 112, 114, 116 to each document portion 106 of the set of document portions 106. In such instances, the plurality of labels 112, 114, 116 may correspond to different topics. The topic scores 130 may include a score reflecting a priority of each label 112, 114, 116 (and each corresponding topic 118, 120, 122) within documents 104 containing the document portions 106, 108, 110.

At block 402, the method ingests data from disparate data sources to identify data portions of multiple data sets with information that relate to the one or more issues. At block 404, the method evaluates the information for each data set against an ensemble model to determine a set of topics for the one or more issues. At block 406, the method generates a topic materiality score for each data portion that indicates relevancy of the information to a particular topic in the set of topics. At block 408, the method trains a time series aggregation model with the topic materiality scores of the one or more issues over time for the data portions of multiple data sets. At block 410, the method utilizes the time series aggregation model to generate insights analysis for a selected issue of the one or more issues. At block 412, the method applies the insight analysis to updated data from the disparate data sources to output a prediction or recommendation for the selected issue.

In an example, the computing device 102 may generate document scores 128 for the documents 104, such as for each document 104 from the corpus of documents. The document score 128 for an associated document 104 may be generated based on one or more topic scores 130 associated with one or more document portions 106, 108, 110 corresponding to the associated document 104. As explained further above, the topic scores 130 may be aggregated, weighted, normalized, or combinations thereof to generate the document scores 128.

The system includes outputting a set of document scores 128. For example, the computing device 102 may output a set of document scores 128 for the documents 104. In certain implementations, the computing device 102 may output a set of document scores 128 that includes separate document scores 128 for each of the documents 104 within the corpus of documents. As explained further above, outputting the document scores 128 may include generating one or more of a recommendation 132, a report 134, time series data 136, an asset hierarchy model 126, and/or metrics 144 for the asset hierarchy model 126.

Figure 5:
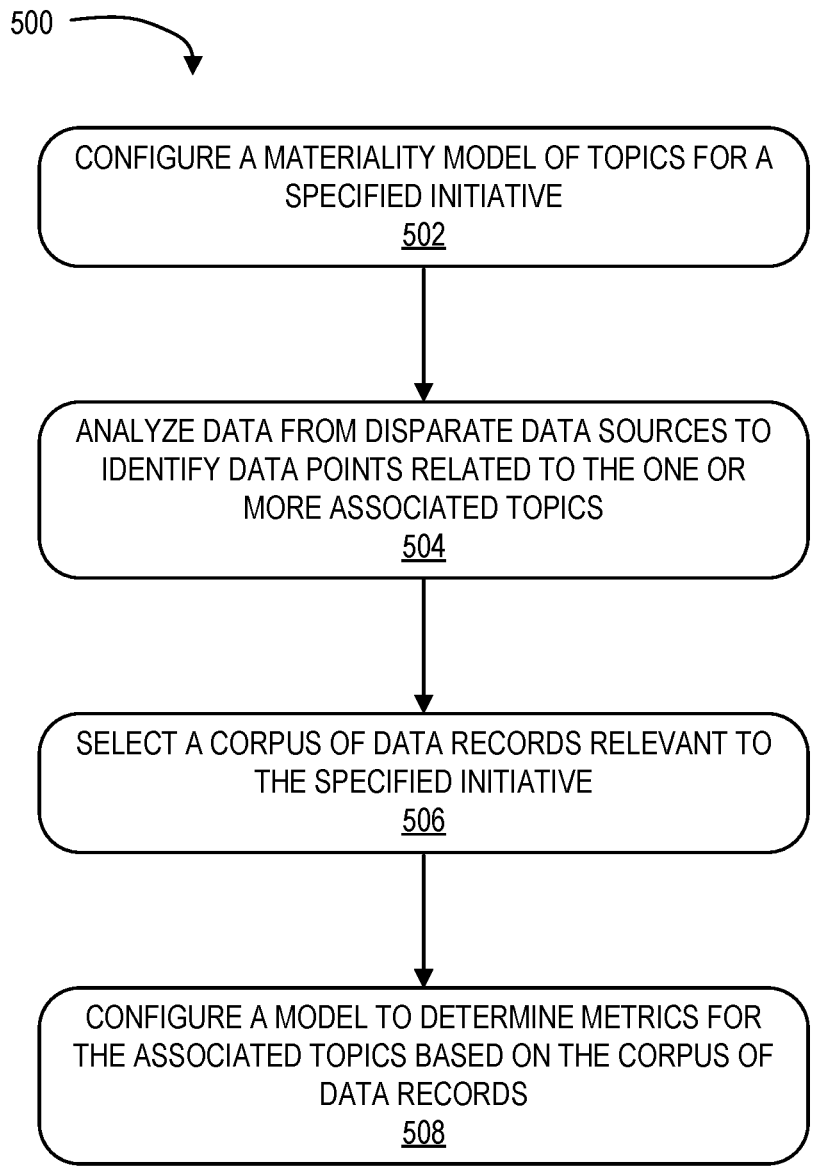
FIG. 5 depicts a method for tracking organizational progress amongst one or more initiatives according to an exemplary embodiment of the present disclosure.

FIG. 5 depicts a method 500 for tracking organizational progress amongst one or more initiatives according to an exemplary embodiment of the present disclosure. The method 500 may be implemented on a computer system, such as the system 300. For example, the method 500 may be implemented by the computing device 302. The method 500 may also be implemented by a set of instructions stored on a computer readable medium that, when executed by a processor, cause the computing device to perform the method 500. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks may be optional.

The method 500 includes configuring a materiality model of topics for a specified initiative (block 502). For example, the computing device 302 may configure a materiality model 312 of topics 320, 322 for a specified initiative 316, 318. The materiality model 312 may identify one or more associated topics 320, 322 corresponding to the specified initiatives 316, 318, along with one or more targets 324, 326 for the topics.

The method 500 includes analyzing data from disparate data sources to identify data points that are related to the one or more associated topics (block 504). For example, the computing device 302 may analyze, by the materiality model 312, data from disparate data sources 304, 306 to identify data points 308, 310 that are related to the one or more associated topics 320, 322. The disparate data sources 304, 306 include at least one internal asset data source and at least one external data source. In such instances, at least one of the disparate data sources 304, 306 contains multiple types of data records (e.g., documents 334).

The method 500 includes selecting a corpus of documents relevant to the specified initiative (block 506). For example, the computing device 302 may select, based on the data points 308, 310, a corpus of documents 334 relevant to the specified initiative. The corpus of documents 334 may be selected from among the data from disparate data sources 304, 306. In certain implementations, selecting the corpus of documents 334 may be implemented at least in part by the method 400. In particular, the corpus of documents 334 may be selected as documents with corresponding document scores 128 that indicate the documents discuss or contain information relevant to one or more of the associated topics 320, 322.

The method 500 includes configuring a model to determine metrics for the associated topics 118, 120, 122 based on the corpus of documents 334 (block 508). For example, the computing device 302 may configure a machine learning model 314 to determine metrics 330, 332 for at least a subset of the associated topics 320, 322 based on the corpus of documents 334. The metrics 330 may reflect a relevance measure of the one or more associated topics 320, 322 for corresponding data from the disparate data sources 304, 306. In further implementations, as discussed further above, the metrics 330, 332 may include one or more computed scores, such as scores computed based on targets 324, 326 associated with the topics 320, 322.

Figure 6:
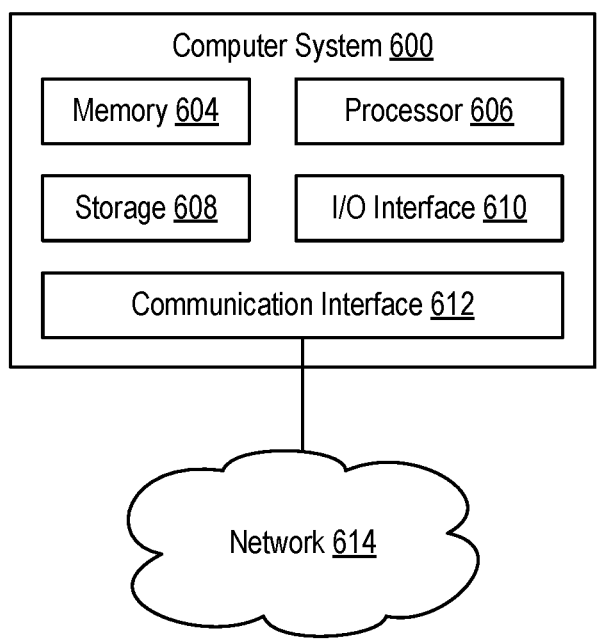
FIG. 6 illustrates an example computer system according to an exemplary embodiment of the present disclosure.

FIG. 6 illustrates an example computer system 600 that may be utilized to implement one or more of the devices and/or components discussed herein, such as the computing devices 102, 302 and the data sources 304, 306. In particular embodiments, one or more computer systems 600 perform one or more steps of one or more methods described or illustrated herein. In particular embodiments, one or more computer systems 600 provide the functionalities described or illustrated herein. In particular embodiments, software running on one or more computer systems 600 performs one or more steps of one or more methods described or illustrated herein or provides the functionalities described or illustrated herein. Particular embodiments include one or more portions of one or more computer systems 600. Herein, a reference to a computer system may encompass a computing device, and vice versa, where appropriate. Moreover, a reference to a computer system may encompass one or more computer systems, where appropriate.

This disclosure contemplates any suitable number of computer systems 600. This disclosure contemplates the computer system 600 taking any suitable physical form. As an example and not by way of limitation, the computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, the computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 606, memory 604, storage 608, an input/output (I/O) interface 610, and a communication interface 612.

Although this disclosure describes and illustrates a particular computer system having a particular number of particular components in a particular arrangement, this disclosure contemplates any suitable computer system having any suitable number of any suitable components in any suitable arrangement.

In particular embodiments, the processor 606 includes hardware for executing instructions, such as those making up a computer program. As an example and not by way of limitation, to execute instructions, the processor 606 may retrieve (or fetch) the instructions from an internal register, an internal cache, memory 604, or storage 608; decode and execute the instructions; and then write one or more results to an internal register, internal cache, memory 604, or storage 608. In particular embodiments, the processor 606 may include one or more internal caches for data, instructions, or addresses. This disclosure contemplates the processor 606 including any suitable number of any suitable internal caches, where appropriate. As an example and not by way of limitation, the processor 606 may include one or more instruction caches, one or more data caches, and one or more translation lookaside buffers (TLBs). Instructions in the instruction caches may be copies of instructions in memory 604 or storage 608, and the instruction caches may speed up retrieval of those instructions by the processor 606. Data in the data caches may be copies of data in memory 604 or storage 608 that are to be operated on by computer instructions; the results of previous instructions executed by the processor 606 that are accessible to subsequent instructions or for writing to memory 604 or storage 608; or any other suitable data. The data caches may speed up read or write operations by the processor 606. The TLBs may speed up virtual-address translation for the processor 606. In particular embodiments, processor 606 may include one or more internal registers for data, instructions, or addresses. This disclosure contemplates the processor 606 including any suitable number of any suitable internal registers, where appropriate. Where appropriate, the processor 606 may include one or more arithmetic logic units (ALUs), be a multi-core processor, or include one or more processors 606. Although this disclosure describes and illustrates a particular processor, this disclosure contemplates any suitable processor.

In particular embodiments, the memory 604 includes main memory for storing instructions for the processor 606 to execute or data for processor 606 to operate on. As an example, and not by way of limitation, computer system 600 may load instructions from storage 608 or another source (such as another computer system 600) to the memory 604. The processor 606 may then load the instructions from the memory 604 to an internal register or internal cache. To execute the instructions, the processor 606 may retrieve the instructions from the internal register or internal cache and decode them. During or after execution of the instructions, the processor 606 may write one or more results (which may be intermediate or final results) to the internal register or internal cache. The processor 606 may then write one or more of those results to the memory 604. In particular embodiments, the processor 606 executes only instructions in one or more internal registers or internal caches or in memory 604 (as opposed to storage 608 or elsewhere) and operates only on data in one or more internal registers or internal caches or in memory 604 (as opposed to storage 608 or elsewhere). One or more memory buses (which may each include an address bus and a data bus) may couple the processor 606 to the memory 604. The bus may include one or more memory buses, as described in further detail below.

In particular embodiments, one or more memory management units (MMUs) reside between the processor 606 and memory 604 and facilitate accesses to the memory 604 requested by the processor 606. In particular embodiments, the memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory implementations, this disclosure contemplates any suitable memory implementation.

In particular embodiments, the storage 608 includes mass storage for data or instructions. As an example and not by way of limitation, the storage 608 may include a hard disk drive (HDD), a floppy disk drive, flash memory, an optical disc, a magneto-optical disc, magnetic tape, a Universal Serial Bus (USB) drive, or a combination of two or more of these. The storage 608 may include removable or non-removable (or fixed) media, where appropriate. The storage 608 may be internal or external to computer system 600, where appropriate. In particular embodiments, the storage 608 is non-volatile, solid-state memory. In particular embodiments, the storage 608 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), flash memory, or a combination of two or more of these. This disclosure contemplates mass storage 608 taking any suitable physical form. The storage 608 may include one or more storage control units facilitating communication between processor 606 and storage 608, where appropriate. Where appropriate, the storage 608 may include one or more storages 608. Although this disclosure describes and illustrates particular storage, this disclosure contemplates any suitable storage.

In particular embodiments, the I/O Interface 610 includes hardware, software, or both, providing one or more interfaces for communication between computer system 600 and one or more I/O devices. The computer system 600 may include one or more of these I/O devices, where appropriate. One or more of these I/O devices may enable communication between a person (i.e., a user) and computer system 600. As an example and not by way of limitation, an I/O device may include a keyboard, keypad, microphone, monitor, screen, display panel, mouse, printer, scanner, speaker, still camera, stylus, tablet, touch screen, trackball, video camera, another suitable I/O device, or a combination of two or more of these. An I/O device may include one or more sensors. Where appropriate, the I/O Interface 610 may include one or more device or software drivers enabling processor 606 to drive one or more of these I/O devices. The I/O interface 610 may include one or more I/O interfaces 610, where appropriate. Although this disclosure describes and illustrates a particular I/O interface, this disclosure contemplates any suitable I/O interface or combination of I/O interfaces.

In particular embodiments, communication interface 612 includes hardware, software, or both providing one or more interfaces for communication (such as, for example, packet-based communication) between computer system 600 and one or more other computer systems 600 or one or more networks 614. As an example and not by way of limitation, communication interface 612 may include a network interface controller (NIC) or network adapter for communicating with an Ethernet or any other wire-based network, or a wireless NIC (WNIC) or wireless adapter for communicating with a wireless network, such as a Wi-Fi network. This disclosure contemplates any suitable network 614 and any suitable communication interface 612 for the network 614. As an example and not by way of limitation, the network 614 may include one or more of an ad hoc network, a personal area network (PAN), a local area network (LAN), a wide area network (WAN), a metropolitan area network (MAN), one or more portions of the Internet, or a combination of two or more of these. One or more portions of one or more of these networks may be wired or wireless. As an example, computer system 600 may communicate with a wireless PAN (WPAN) (such as, for example, a Bluetooth® WPAN), a WI-FI network, a WI-MAX network, a cellular telephone network (such as, for example, a Global System for Mobile Communications (GSM) network), any other suitable wireless network, or a combination of two or more of these. Computer system 600 may include any suitable communication interface 612 for any of these networks, where appropriate. Communication interface 612 may include one or more communication interfaces 612, where appropriate. Although this disclosure describes and illustrates a particular communication interface implementation, this disclosure contemplates any suitable communication interface implementation.

In some example implementations, materiality as part of an ESG optimization application can be used with a model-driven architecture that includes a type system. The generative artificial intelligence module 150 can also be used with a model-driven architecture that includes a type system. Traditional topic modeling approaches have fluctuating utility for identifying topics in documents but struggle at tracking and providing analysis of across-topic themes. The topics generated by topic models are typically static and can be difficult to interpret, particularly when applied for complex or abstract themes. Conventional topic modeling requires robustly trained and carefully tuned models for specific use cases that scale poorly and are computationally expensive. For example, traditional topic models suffer from overfitting of the training data for narrow topics that are specific to the corpus and fail to address changing vocabulary in new documents.

A model-driven architecture is a term for a software design approach that provides models as a set of guidelines for structuring specifications. An example model-driven architecture may include a type system that may be used as a domain-specific language (DSL) within a platform used to access data, interact with data, and/or perform processing or analytics based on one or more type or function definitions within the type system. By using an abstraction layer provided by a type system, the complexity of a logistics optimization application problem can be reduced by orders of magnitude, such as to the order of a few thousand types, for any given logistics optimization application that a programmer manipulates using JAVASCRIPT or other language to achieve a desired result. Thus, all of the complexity of the underlying foundation (with an order of M×S×T×A×U using structured programming paradigms) is abstracted and simplified for the programmer. Here, M represents the number of process modules (APACHE Open Source modules are examples of process modules), S represents the number of disparate enterprise and extraprise data sources, T represents the number of unique sensored devices, A represents the number of programmatic APIs, and U represents the number of user presentations or interfaces. Example technologies that can be included in one or more embodiments may include nearly-free and unlimited compute capacity and storage in scale-out cloud environments, such as AMAZON Web Services (AWS); big data and real-time streaming; smart connected devices; mobile computing; and data science including big-data analytics and machine learning to process the volume, velocity, and variety of big-data streams.

The type system of the model-driven architecture may include types as data objects and at least one of: associated methods, associated logic, and associated machine learning classifiers. One or more of the data objects may be associated with at least one of: one or more customers, one or more companies, one or more accounts, one or more products, one or more employees, one or more suppliers, one or more opportunities, one or more contracts, one or more locations, and one or more digital portals. Type definitions may include properties or characteristics of an implemented software construct. Type definitions can be a canonical type declared in metadata using syntax similar to that used by types persisted in a relational or NoSQL data store. A canonical model in the type system is a model that is application agnostic (i.e., application independent), enabling all applications to communicate with each other in a common format. Unlike a standard type, canonical types are comprised of two parts, the canonical type definition and one or more transformation types. The canonical type definition defines the interface used for integration and the transformation type is responsible for transforming the canonical type to a corresponding type. Using the transformation types, the integration layer may transform a canonical type to the appropriate type.

The type system provides data accessibility, compatibility and operability with disparate systems and data. Specifically, the type system solves data operability across a diversity of programming languages, inconsistent data structures, and incompatible software application programming interfaces. The type system provides data abstraction that defines extensible type models that enable new properties, relationships, and functions to be added dynamically without requiring costly development cycles. The type system can be used as a domain-specific language (DSL) within a platform used by developers, applications, or UIs to access data. The type system provides interactability with data to perform processing, predictions, or analytics based on one or more type or function definitions within the type system.

An example data insights for latent topic materiality ESG application on the model-driven architecture can include functions and modules to improve machine learning processes and performance with data management modules, such as a prediction module, a simulation module, a materiality module, an optimization module, a reporting module, an automation module, a control module, etc.

An ESG application can be used with various enterprise functions, such as messaging, reporting, alerting, etc. processes to update systems based on triggers, detecting anomalies, real-time data streams, etc. In example enterprise environments, the logistics optimization application can control or instruct manufacturing or resource planning systems. In an example implementation, when volatility is predicted or detected in supply chain networks, simulations using materiality scores can be employed to automatically realize instructions or commands that can re-strategize to better leverage operation controls, such as minimizing the amount of carbon impact by an organization. The system may have the ability to ingest and analyze source data (e.g., news/media) and analyze via a natural language processing (NLP) pipeline to identify relevant ESG issues and produce materiality scores. It may enable users to identify mentions of the company organization in connection to ESG issues. It may enable the customer to integrate full-text news/media data feeds that the customer is subscribed to, with the ability to drill-down to investigate individual news/media outlets. The data model may include a target (e.g., stakeholder) category wherein the target corresponds to news/media outlets. For example, the system may identify news articles mentioning relevant material ESG issues in order to understand which issues are being focused on by the media. In another example, the system may understand trends over time in mentions of ESG issues by the news/media in order to track how the focus of the news/media on ESG issues is evolving over time. In another example, the system may read excerpts from news articles related to ESG issues in order to understand the context surrounding news/media mentions of ESG issues.

The system may have the ability to receive and/or provide action alerts identifying emerging ESG risks and including existing and emerging materials published by regulators. It may enable users/systems to immediately act on these insights by assigning ownership, creating or updating goals/targets, and/or adding new reporting requirements to company sustainability reports. For example, the system may be alerted to evidence with highly material information from priority targets as soon as it is published in order to ensure that the system can take appropriate immediate action based on this information. In another example, the system may tag this evidence appropriately to a corresponding report, initiative, or project to ensure that these insights are incorporated into the relevant aspects of an entity (e.g., user or organization) ESG program.

The system can decompose aggregate materiality scores for priority ESG issues to identify trends across stakeholder groups (competitors, customers, investors, etc.) as well as for individual stakeholders within each group. Users can review the specific language used by stakeholders when describing ESG issues through NLP-extracted excerpts of source documents tied to individual ESG issues. Users can additionally filter by document type to compare/contrast the language used across data records (e.g., financial reports vs. sustainability reports vs. press releases).

The UI may extend the filter panel to also act on a KronoGraph heat map component. The UI may also include a new tab within the materiality page with new visualizations enabling drill-down analysis. The UI may also include charts enabling comparing/contrasting of materiality scores over time across different target groups, targets (e.g., stakeholders), and/or data records (e.g., source documents). Interactions may enable dynamic understanding of language/excerpts as part of user investigations.

For example, the system analyzes trends in issue materiality scores for individual issues by target group to understand how the importance of ESG issues is varying over time for a group of targets. In another example, the system may compare and contrast trends in issue materiality scores between target groups in order to understand the relative importance that different target groups place on ESG issues over time. In another example, the system may compare and contrast trends in issue materiality scores between targets in order to understand the relative importance placed on ESG issues by different targets within a target group. In another example, the system may compare and contrast trends in issue materiality scores between document types for a given target in order to understand the relative importance placed on ESG issues within different document types for a given target. In another example, the system may review excerpts associated with each of the above trends in order to understand the specific language being used by stakeholders associated with the observed materiality scores.

The system may provide the ability (e.g., by a user or system) to track mentions of the company's organization in connection with priority ESG issues. The system may provide the ability to correlate public events (e.g., announcements, issued reports, etc.) tied to specific ESG issues with subsequent mentions of the user's organization tied to these issues. The system may additionally enable monitoring trends in company mentions across stakeholder groups, individual targets, and target communication channels. The system may also provide visualizations to enable users to track individual events to see rates of company-mentions tied to specific ESG issues. The system may also have the ability to detect company mentions within target documents in proximity with labeled ESG excerpts.

For example, the system enables users to understand if a company is mentioned in conjunction with any ESG issues in order to prioritize reviewing excerpts that directly relate to the company. In another example, the system tracks how public-facing actions impact mentions of the company in order to understand how actions are impacting how topics are perceived by targets. In another example, the system provides insights into how different types of public-facing actions impact mentions of a company in order to analyze how different forms of outbound communication or engagement impact are perceived by targets. In another example, the system can disaggregate mentions of the company by target group, target, and/or communication channel in order to compare and contrast how the company is being discussed across different targets and data record types.

The system may use one or more models (e.g., ensemble, time-aggregate, multi-modal, natural language processing models, machine learning models, large language models) to associate an organization with one or more ESG issues (e.g., climate). For example, the system may use a natural language processing model to determine a context of an input and determine that an input including "Acme" and "Climate" is referring to Acme Manufacturing Company, as opposed to Acme Research Company. The system may determine context by training the models on domain-specific (e.g., enterprise/organization-specific) datasets. Based on this context, the system may generate reports, alerts, and/or the like, identifying data records (e.g., current news articles) mentioning Acme Manufacturing Company and climate issues. The system may also use generative artificial intelligence features (e.g., as discussed elsewhere herein) to provide corresponding intuitive language summaries or alerts.

The system includes the ability to review a summary of major ESG themes extracted from documents ingested over a prior 24-hour period, with drill-down capability by target group, individual target, and/or data record type. The system may include the ability to persist multiple excerpts from each data record/issue combination (e.g., if needed to generate a summary). The UI may display summary statistics such as the number of data records ingested over a 24 hour period, and/or top themes/summary of key excerpts. The system may include the ability to produce multiple excerpts per data record/issue combination and/or extract key themes. It may use a word cloud and/or generate text that summarizes excerpts (either in their entirety, and/or by issue, and/or by target).

The system enables a user to review key ESG-related themes/take-aways from documents published by targets over the prior day to quickly understand new information and identify if the user needs to drill down further into individual excerpts or full data records. In another example, the system may understand which themes are being driven by which stakeholders and/or documents in order to contextualize the summary to specific stakeholders so a user can take appropriate action (e.g., engaging a particular target, including information in a report aligned to a specific target, etc.).

The system dynamically generates summaries of key insights synthesized from ingested documents across defined time periods, groupings of targets, and/or groupings of document types. The system enables users to identify shifts in stakeholder ESG priorities as well as drill down to review excerpts from ingested documents for additional detail. The system can display trends as well as summaries of ingested data records for the selected time period/stakeholders/documents.

For example, the system tracks key ESG-related themes, trends, and insights from data records published by targets over any time period to understand key take-aways related to critical ESG periods over various time horizons. In another example, the system may compare and contrast ESG-related themes for different selected time periods to compare and contrast key themes from different time periods. In another example, the system may generate ESG-related themes/take-aways for specific target groups, targets, and/or or document types to compare and contrast key themes for the same time period across different targets and communication channels. The system may include the ability to automate the calculation of enterprise-level Scopes 1, 2, and 3 emissions through ingestion of activity data and conversion to emissions via a library of emissions factors. The system may enable continuous management of an emissions factor library and NLP-based matching of emissions factors to activity data for scope 3 emissions and flexible emission factor management.

The system includes initiatives and projects portfolio management dashboards which may have the ability to track and manage a portfolio of initiatives and projects across ESG issues, owners, business assets, and statuses. The system may notify users of off-track initiatives and projects requiring updates. The system may also provide project management and collaboration—the ability to create new projects and track project costs, returns, owners, status, and progress against plans.

In some implementations, the system provides data sources for all matters of materiality related to ESG, aggregated and synthesizing the many ERP, supply chain, procurement, Cadence, CRM, HR, and other enterprise systems installed in an enterprise, all tracked longitudinally at the asset division and corporate levels. This may, for example, enable organizations to publish their ESG compliance reports consistent with a multiplicity of conflicting ESG reporting standards, including SASB, GRI, TCFD, and CDP. The system may also provide rich predictive analytics using AI to allow managers to track their gaps to plan for ESG materiality in out years, such as CO2, H2O, methane, workplace injuries, or otherwise. The system may also recommend mitigation measures (e.g., corrective actions) to close the gaps so the entity (e.g., company) can be assured of meeting its ESG objectives in 2030, 2040, 2050, or other year.

In one example, the system may access a data record datastore (e.g., a data record corpus organized by target and data record type). As used herein, target may refer to a stakeholder, and/or other type of target. The system can split and/or pre-process the data into segments (e.g., paragraphs). The system may perform a multi-issue sentiment and intensity analysis using the segments, ESG issue, sentiment or intensity prompt, target, and/or target entity (e.g., target organization) as inputs. Using a few-shot prompt to large language model, the system may obtain a response and parse the response. The output may be a segment-level issue sentiment and intensity. The system may aggregate the output into a data record-level issue sentiment and intensity. The system may then display that information (e.g., in a data record analyzer user interface).

In some situations, entities (e.g., organizations) may want to prioritize material ESG issues and understand how their targets (e.g., stakeholders) perceive the entity's actions. Accordingly, the system may provide functionality (e.g., ESGPT) that uses generative AI to (1) identify how intensely targets discuss material ESG issues, and/or (2) understand target sentiment about the entity in relation to material ESG issues, and/or (3) analyze data records in-app with an intuitive UI (e.g., in SDL).

In some embodiments, the ESG viability targeting and resource allocation system can work with enterprise generative artificial intelligence architecture that has an orchestrator agent (or, simply, orchestrator) that supervises, controls, and/or otherwise administrates many different agents and tools. Orchestrators can include one or more machine learning models and can execute supervisory functions, such as routing inputs (e.g., queries, instruction sets, natural language inputs or other human-readable inputs, machine-readable inputs) to specific agents to accomplish a set of prescribed tasks (e.g., retrieval requests prescribed by the orchestrator to answer a query). An orchestrator is part of an enterprise generative artificial intelligence framework for applications to implement machine learning models such as multimodal models, large language models (LLMs), and other machine learning models with enterprise-grade integrity including access control, traceability, anti-hallucination, and data-leakage protections. Machine learning models can include some or all of the different types or modalities of models described herein (e.g., multimodal machine learning models, large language models, data models, statistical models, audio models, visual models, audiovisual models, etc.). Traceable functions enable the ability to trace back to source documents and data for every insight that is generated. Data protection elements protect data (e.g., confidential information) from being leaked or contaminating inherit model knowledge. The enterprise generative artificial intelligence framework provides a variety of features that specifically address the requirements and challenges posed by enterprise systems and environments. The applications in the enterprise generative artificial intelligence framework can securely, efficiently, and accurately use generative artificial intelligence methodologies, algorithms, and multimodal models (e.g., large language models and other machine learning models) to provide deterministic responses (e.g., in response to a natural language query and/or other instruction set) that leverage enterprise data across different data domains, data sources, and applications. Data can be stored and/or accessed separately and distinctly from the generative artificial intelligence models. Execution of applications in the enterprise generative artificial intelligence framework prevents large language models of the generative artificial intelligence system from being trained using enterprise data, or portions thereof (e.g., sensitive enterprise data). This provides deterministic responses without hallucination or information leakage. The framework is adaptable and compatible with different large language models, machine-learning algorithms, and tools.

Agents can include one or more multimodal models (e.g., large language models) to accomplish the prescribed tasks using a variety of different tools. Different agents can use various tools to execute and process unstructured data retrieval requests, structured data retrieval requests, API calls (e.g., for accessing artificial intelligence application insights), and the like. Tools can include one or more specific functions and/or machine learning models to accomplish a given task (or set of tasks). Agents can adapt to perform differently based on contexts. A context may relate to a particular domain (e.g., industry) and an agent may employ a particular model (e.g., large language model, other machine learning model, and/or data model) that has been trained on industry-specific datasets, such as healthcare datasets. The particular agent can use a healthcare model when receiving inputs associated with a healthcare environment and can also easily and efficiently adapt to use a different model based on different inputs or context. Indeed, some or all of the models described herein may be trained for specific domains in addition to, or instead of, more general purposes. The enterprise generative artificial intelligence architecture leverages domain-specific models to produce accurate context-specific retrieval and insights.

For example, ESGPT may pose questions to large language model(s) about ESG issue content intensity (e.g., 0 to 5) and the target's sentiment towards the entity regarding an issue (e.g., −5 to 5). Standard natural language processing cannot measure intensity or sentiment towards an entity regarding a particular topic, but generative AI can address this problem. More specifically, the system can provide context on the user's entity, targets, and ESG issues. In some implementations, from GPT's numerical responses, the system can score the source material and persist these results.

In some implementations, the system may fine-tune large language model prompts and/or provide explainability for sentiment and intensity determinations. The system may also provide support for PDF exploration and improve styling for data records (e.g., HTML documents). In some implementations, the system may incorporate Enterprise Search into the document explorer, and/or build sentiment trend analysis in the ESG applications.

In some implementations, the system may provide features and functionality that are not typically provided by machine learning systems. For example, typical machine learning systems do not handle natural language inputs well and may require expert knowledge by end users in order to be used effectively, which can degrade human-computer interactions. In some implementations, the system may use generative artificial intelligence methodologies and generative artificial intelligence models to provide an intuitive natural language interface between end users and the technologies described herein. More specifically, the system may allow end users to use natural language inputs (e.g., queries, instruction sets) to obtain natural language results (e.g., answers, summaries, instruction sets).

For example, an input may be "Is the organization compliant with ESG standards?" The system may provide the input to one or more large language models (and/or other machine learning models) which can interpret the query and determine an answer using context provided by the large language models and the underlying features of the computing device 102. More specifically, the large language models may have been specifically trained on domain-specific datasets (e.g., an enterprise dataset), which can allow the system to make inferences in response to the natural language input that other machine learning systems would not be able to make For example, the system could leverage the specifically trained large language models to determine that "the organization" is the user's organization, retrieve applicable ESG standards, determine whether the organization is compliant based on the domain-specific datasets, and generate an intuitive natural language summary based thereon. Although in this example the input is a user input, it will be appreciated that inputs can also include system inputs (e.g., machine-readable inputs).

In some implementations, an interface provided by the system comprises one or more abstraction layers that connect the functionality of the computing device 102 to various end-user front ends and/or other systems. For example, a front-end may include a graphical user interface that accepts natural language inputs (e.g., search queries input into a search box) which the interface can interpret (e.g., using one or more large language models) to generate a result (e.g., an answer) using features of the computing device 102 (e.g., AI applications).

The system may also generate natural language reports, summaries, and other intuitive human-readable summaries, of machine learning insights, recommendations, determinations, etc., (e.g., provided by the computing device 102). For example, a user may provide the query "How can the organization become compliant with ESG standards?" The system may not only provide ESG standards that apply to the user's organization, but also provide a natural language summary indicating the data records used to generate the answer, as well as one or more steps that may be taken to bring the organization into compliance with the standards. The summary may also include links to those data records. It will be appreciated that the system may interface with some or all of the features of the computing device 102 and/or other systems. As used herein, the system may refer to computing device 102 and/or other systems.

In some implementations, the system may use generative artificial intelligence to generate reports that are compliant with various standards or other requirements. For example, the system may format the reports in a format required, or typically used by, regulators. For example, the system may already know an entity's carbon footprint for a particular product, and the system may use that to generate a natural language report in a format used by regulators.

An example implementation includes evaluating information associated with a set of data record portions from a corpus of data records against an ensemble model to generate a set of topic scores, wherein the ensemble model is configured to assign a plurality of labels to each data record portion of the set of data record portions, the plurality of labels corresponding to a different topic of a set of topics, and wherein the set of topic scores comprises a score for each label of the plurality of labels. The method includes generating data record scores for each data record of the corpus of data records, wherein a data record score for an associated data record is generated based on one or more topic scores of the set of topic scores associated with one or more data record portions of the set of data record portions corresponding to the associated data record; and outputting a set of data record scores that includes a data record score for each data record of the corpus of data records, wherein the set of data record scores indicate a set of topics identified within the corpus of data records.

The ensemble model can be configured to generate the set of topic scores based on a first set of predictions and a second set of predictions output by a first model and a second model, respectively. The first model can be further configured to search the set of data record portions for one or more keywords associated with the set of topics, and generate the first set of predictions based on identification of keywords associated with the set of topics for each of the data record portions. An example implementation can further include extracting, using the first model, the second model, or both, a set of embedding vectors corresponding to the set of data record portions.

The method can further include determining a similarity score for each embedding vector of the set of embedding vectors based on a set of centroid embedding vectors corresponding to the set of topics, wherein the ensemble model is configured to generate the set of topic scores based at least in part on the similarity scores determined for the set of embedding vectors, wherein the first set of predictions or the second set of predictions includes the set of topic scores.

In a further implementation, determining a similarity score, for each data record portion, can be done with one or more nearest neighbors based on the embedding. The method can further include searching each nearest neighbor for a particular data record portion based on one or more keywords associated with the set of topics; determining one or more topic predictions associated with each data record portion of the set of data record portions based on the searching; and outputting the one or more topic predictions to the ensemble as the second set of predictions. The method can further determine, based on the searching, whether a particular keyword is present in a threshold number of nearest neighbors, wherein a particular topic of the set of topics is identified for a particular data record portion when one or more keywords are identified within at least the threshold number of nearest neighbors. Where the one or more nearest neighbors are identified based on training data, the method further includes determining candidate topics corresponding to each data record portion based on labels associated with the nearest neighbors identified within the training data; and outputting predicted topics determined for each data record portion as the second set of predictions based on the candidate topics. The predicted topics can be identified based on whether a threshold number of nearest neighbors include labels corresponding to a same topic.

Example implementations can include converting a set of data record scores into timeseries data representing relevance for each topic associated with an initiative and normalizing the data record scores based at least in part on a data record type associated with data records corresponding to each of the data record scores. A timescale of the timeseries data can re-configure significance of topics over time based on an output target.

The method can include determining a significance of the set of topics with respect to a selected initiative, generating one or more recommendations based on the significance of at least one topic, and executing one or more actions based on the recommendation. Determining the actions can be based on a significance of at least one topic at a particular time where, optionally, the set of topics is associated with environmental, social, and governance (ESG) topics. Outputting the set of data record scores can be used to generate recommendations for initiatives based on initiative topics in view of topic scores associated with the set of data records, where the recommendations improve performance of at least one factor associated with one or more of the initiative topics. Tracking performance of factors can include tracking progress towards completing the initiative. The labels can include at least one label associated with a composite topic, the composite topic corresponding to a first topic and a second topic of the set of topics.

A data model can be generated corresponding to an output standard, wherein the output is generated based at least in part on the data model and, for example, includes defining an asset hierarchy model, tracking metrics associated with the set of topics, and extracting information from the data records based at least in part on the hierarchy model, the extracted information incorporated into the output and including at least a portion of the tracked metrics. Metrics associated with at least one topic can be aggregated according to an output criterion. The metrics can be aggregated into an output selected from the group consisting of an evidence package, a report, a dynamic dashboard, an instruction set, and an inquiry response. Applying the ensemble model to a data record can include soliciting information associated with the topics; identifying one or more data sources from which to obtain the information solicited in the data record based on one or more labels determined with respect to the data record by the ensemble model; and generating a report that includes the solicited information based on data obtained from the one or more data sources.

An example implementation includes configuring a materiality model of topics for a specified initiative, wherein the materiality model identifies one or more associated topics corresponding to the specified initiative; analyzing, by the materiality model, data from disparate data sources to identify data points or inputs that are related to the one or more associated topics, wherein the disparate data sources include at least one internal asset data source and at least one external data source, and wherein at least one of the disparate data sources contains multiple types of data records; selecting, based on the data points, a corpus of data records relevant to the specified initiative, wherein the corpus of data records is selected from among the data from disparate data sources; and configuring a machine learning model to determine metrics for at least a subset of the associated topics based on the corpus of data records, wherein the metrics reflect a relevance measure of the one or more associated topics for corresponding data from the disparate data sources.

The data points can include at least one data point selected from the group consisting of issues related to the one or more associated topics, goals related to the one or more associated topics, sub-issues for one or more issues related to the one or more associated topics, a measurement metric related to the one or more associated topics, and a performance measure related to the one or more associated topics. The machine learning model can be configured to determine a respective performance score for each respective topic of the associated topics, wherein the respective performance score indicates a contribution of the initiative to overall performance for the respective issue. The topic can be an issue or goal for completion by an entity associated with the specified initiative.

The method can further include determining first spending data associated with the specified initiative, wherein the first spending data reflects spending activity for a first entity associated with the specified initiative; comparing the first spending data with second spending data associated with the specified initiative, wherein the second spending data reflects spending activity for a plurality of entities separate from the first entity; and determining a benchmark score for the first entity based on the comparison.

Another example approach being implemented by a computing system including one or more physical processors and storage media storing machine-readable instructions, includes determining, using one or more models, an intensity value indicating an amount that one or more targets discuss one or more Environmental, Social, and Governance (ESG) issues, the one or more targets belonging to an entity;

determining, using one or more models, a sentiment value associated with the target regarding the entity of the target in relation to the one or more ESG issues; and analyzing, using one or more models based on the intensity value and the sentiment value, a plurality of data records.

The models can include any of one or more natural language processing models, one or more large language models, and one or more machine learning models. Analyzing can be performed in-app with an intuitive user interface (e.g., in SDL). Fine-tuning one or more multi-modal or large language model prompts for the models can be used to provide explainability for the determination of intensity (e.g., explainability of sentiment and intensity). An intensity value can be determined based on context provided to the one or more models, wherein the context is based on the target, the entity, and the one or more ESG issues. Scoring can be done for the plurality of data records and persisting the context and/or scores with support for PDF exploration and/or improving styling for web documents (e.g., HTML documents). In some implementations, the system may trigger the functionality of the computing device 102. For example, a natural language input processed by one or more trained large language models may trigger an evaluation of data records. In some implementations, the trained large language models may cooperate with one or more other models (e.g., multi-modal models, machine learning models, natural language processing models) to provide the generative artificial intelligence features described herein. For example, the large language models may cooperate with a discriminator model which may validate results of the large language models. For example, the discriminator model may verify that an answer is supported by an enterprise dataset. If not, it may downweigh, or otherwise weight, the answer or instruct the system to generate a different answer (and may use the discriminator output as context for the next answer).

In some implementations, the system may also provide forecasting using generative artificial intelligence. For example, the system may use generative artificial intelligence to determine various projects that will help an entity attain an ESG goal, and/or which projects are hindering progress towards that goal. In some implementations, the system may generate instruction sets in response to inputs. For example, an input may include asking how to become compliant with an ESG standard, and the response may include one or more instruction sets that may be provided to other systems (e.g., a smart building) to help the entity become compliant.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. Example types of computing devices and/or processing devices include one or more microprocessors, microcontrollers, reduced instruction set computers (RISCs), complex instruction set computers (CISCs), graphics processing units (GPUs), data processing units (DPUs), virtual processing units, associative process units (APUs), tensor processing units (TPUs), vision processing units (VPUs), neuromorphic chips, AI chips, quantum processing units (QPUs), cerebras wafer-scale engines (WSEs), digital signal processors (DSPs), application specific integrated circuits (ASICs), field programmable gate arrays (FPGAs), or discrete circuitry.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A method comprising:
ingesting data from a from disparate data sources to identify data portions of multiple data sets with information that relate to the one or more issues;
evaluating the information for each data set against an ensemble model to determine a set of topics for the one or more issues;
generate a topic materiality score for each data portion that indicate relevancy of the information to a particular topic in the set of topics;
training a time series aggregation model with the topic materiality scores to the one or more issues over time for the data portions of multiple data sets;
utilizing the time series aggregation model to generate insights analysis for a selected issue of the one or more issues;
applying the insight analysis to updated data from the disparate data sources to output a prediction or recommend for the selected issue;
executing one or more actions in response to the prediction or recommendation, wherein the one or more actions include assigning computing power to an initiative.

2. The method of claim 1, wherein the data include at least one data point selected comprising a measurement metric related to the one or more topics of the set of topics, and a performance measure related to the one or more topics of the set of topics.

3. The method of claim 1, wherein the time series aggregation model is configured to determine a respective performance score for each respective topic of the associated of topics, wherein the respective performance score indicates a contribution of the initiative to overall performance for the respective issue.

4. The method of claim 1 wherein ingesting data from a from disparate data sources uses canonical type declarations with metadata to normalize data portions from different data sources.

5. The method of claim 1, wherein the disparate data sources include enterprise data sources of an organization, wherein the set of topics are latent, and wherein the one or more issues comprises Environmental, Social, and Governance (ESG) issues for the organization.

6. The method of claim 1, wherein the initiative is designed to offset carbon emissions.

7. The method of claim 1, wherein the one or more actions include instructing one or more artificial intelligence applications to generate action items for improving progress of the initiative.

8. A system comprising:
one or more processors; and
memory storing instructions that, when executed by the one or more processors, cause the system to perform:
ingesting data from a from disparate data sources to identify data portions of multiple data sets with information that relate to the one or more issues;
evaluating the information for each data set against an ensemble model to determine a set of topics for the one or more issues;
generate a topic materiality score for each data portion that indicate relevancy of the information to a particular topic in the set of topics;
training a time series aggregation model with the topic materiality scores to the one or more issues over time for the data portions of multiple data sets;
utilizing the time series aggregation model to generate insights analysis for a selected issue of the one or more issues;
applying the insight analysis to updated data from the disparate data sources to output a prediction or recommend for the selected issue;
executing one or more actions in response to the prediction or recommendation, wherein the one or more actions include assigning computing power to an initiative.

9. The system of claim 8, wherein the data include at least one data point selected comprising a measurement metric related to the one or more topics of the set of topics, and a performance measure related to the one or more topics of the set of topics.

10. The system of claim 8, wherein the time series aggregation model is configured to determine a respective performance score for each respective topic of the associated of topics, wherein the respective performance score indicates a contribution of the initiative to overall performance for the respective issue.

11. The system of claim 8 wherein ingesting data from a from disparate data sources uses canonical type declarations with metadata to normalize data portions from different data sources.

12. The system of claim 8, wherein the disparate data sources include enterprise data sources of an organization, wherein the set of topics are latent, and wherein the one or more issues comprises Environmental, Social, and Governance (ESG) issues for the organization.

13. The system of claim 8, wherein the initiative is designed to offset carbon emissions.

14. The system of claim 8, wherein the one or more actions include instructing one or more artificial intelligence applications to generate action items for improving progress of the initiative.

15. A non-transitory computer readable medium comprising instructions that, when executed, cause one or more processors to perform:
ingesting data from a from disparate data sources to identify data portions of multiple data sets with information that relate to the one or more issues;
evaluating the information for each data set against an ensemble model to determine a set of topics for the one or more issues;
generate a topic materiality score for each data portion that indicate relevancy of the information to a particular topic in the set of topics;
training a time series aggregation model with the topic materiality scores to the one or more issues over time for the data portions of multiple data sets;
utilizing the time series aggregation model to generate insights analysis for a selected issue of the one or more issues;
applying the insight analysis to updated data from the disparate data sources to output a prediction or recommend for the selected issue;
executing one or more actions in response to the prediction or recommendation, wherein the one or more actions include assigning computing power to an initiative.

16. The non-transitory computer readable medium of claim 15, wherein the data include at least one data point selected comprising a measurement metric related to the one or more topics of the set of topics, and a performance measure related to the one or more topics of the set of topics.

17. The non-transitory computer readable medium of claim 15, wherein the time series aggregation model is configured to determine a respective performance score for each respective topic of the associated of topics, wherein the respective performance score indicates a contribution of the initiative to overall performance for the respective issue.

18. The non-transitory computer readable medium of claim 15 wherein ingesting data from a from disparate data sources uses canonical type declarations with metadata to normalize data portions from different data sources.

19. The non-transitory computer readable medium of claim 15, wherein the disparate data sources include enterprise data sources of an organization, wherein the set of topics are latent, and wherein the one or more issues comprises Environmental, Social, and Governance (ESG) issues for the organization.

20. The non-transitory computer readable medium of claim 15, wherein the one or more actions include instructing one or more artificial intelligence applications to generate action items for improving progress of the initiative.

* * * * *